United States Patent
Islamov

(10) Patent No.: US 12,206,763 B2
(45) Date of Patent: *Jan. 21, 2025

(54) SECRET MATERIAL EXCHANGE AND AUTHENTICATION CRYPTOGRAPHY OPERATIONS

(71) Applicant: Winkk, Inc., Menlo Park, CA (US)

(72) Inventor: Rustam Islamov, Fremont, CA (US)

(73) Assignee: Winkk, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,177

(22) Filed: Apr. 18, 2023

(65) Prior Publication Data
US 2023/0254121 A1 Aug. 10, 2023

Related U.S. Application Data

(62) Division of application No. 17/040,949, filed as application No. PCT/US2019/041871 on Jul. 15, 2019, now Pat. No. 11,637,694.

(Continued)

(51) Int. Cl.
*G06F 21/00* (2013.01)
*H04L 9/08* (2006.01)
(Continued)

(52) U.S. Cl.
CPC ............ *H04L 9/0819* (2013.01); *H04L 9/085* (2013.01); *H04L 9/0869* (2013.01); *H04L 9/14* (2013.01); *H04L 9/3093* (2013.01)

(58) Field of Classification Search
None
See application file for complete search history.

(56) References Cited

U.S. PATENT DOCUMENTS

| | | |
|---|---|---|
| 5,850,444 A | 12/1998 | Rune |
| 5,987,130 A | 11/1999 | Chang |

(Continued)

FOREIGN PATENT DOCUMENTS

| | | |
|---|---|---|
| CN | 107918790 A | 4/2018 |
| CN | 107924475 A | 4/2018 |

(Continued)

OTHER PUBLICATIONS

Erdem Alkim et al., "Post-Quantum key exchange—a new hope", International Association for Cryptologic Research, vol. 20161116:063839, Nov. 16, 2016, pp. 1-22.

(Continued)

*Primary Examiner* — Lisa C Lewis
(74) *Attorney, Agent, or Firm* — Haverstock & Owens, A Law Corporation

(57) ABSTRACT

Aspects of associative cryptography key operations are described. In one embodiment, a first cryptographic function is applied to secret data to produce a first encrypted result. The first encrypted result is transmitted by a first device to a second device. The second device applies a second cryptographic function to the first encrypted result to produce a second encrypted result. At this point, the secret data has been encrypted by two different cryptographic functions, each of them being sufficient to secure the secret data from others. The two different cryptographic function can be inversed or removed, in any order, to reveal the secret data. Thus, the first device can apply a first inverse cryptographic function to the second encrypted result to produce a first result, and the second device can apply a second inverse cryptographic function to the first result to decrypt the secret data.

3 Claims, 6 Drawing Sheets

Related U.S. Application Data

(60) Provisional application No. 62/698,644, filed on Jul. 16, 2018.

(51) Int. Cl.
   *H04L 9/14* (2006.01)
   *H04L 9/30* (2006.01)
   *H04L 29/06* (2006.01)

(56) References Cited

U.S. PATENT DOCUMENTS

| | | |
|---|---|---|
| 6,947,943 B2 | 9/2005 | DeAnna |
| 7,468,927 B1 | 12/2008 | Battista |
| 7,571,320 B2 | 8/2009 | Davis |
| D607,009 S | 12/2009 | McEnaney |
| 7,683,773 B1 | 3/2010 | Goodall |
| D614,192 S | 4/2010 | Takani |
| 7,885,635 B2 | 2/2011 | Laursen |
| 7,925,013 B1 | 4/2011 | Washington |
| 7,992,102 B1 | 8/2011 | De Angelo |
| 7,992,190 B2 | 8/2011 | Mevissen |
| 8,139,581 B1 | 3/2012 | Mraz |
| 8,218,762 B2 | 7/2012 | Itoh |
| 8,363,259 B2 | 1/2013 | Gillboa |
| 8,417,642 B2 | 4/2013 | Oren |
| 8,417,643 B2 | 4/2013 | Mardikar |
| 8,543,834 B1 | 9/2013 | Barra |
| 8,543,884 B2 | 9/2013 | Mansour |
| 8,621,209 B1 | 12/2013 | Johansson |
| 8,639,785 B2 | 1/2014 | Kiley |
| 8,892,871 B2 | 11/2014 | Cho |
| D719,176 S | 12/2014 | Cohen |
| D719,177 S | 12/2014 | Cohen |
| D723,050 S | 2/2015 | Minsung et al. |
| 8,959,579 B2 | 2/2015 | Barton |
| 9,112,835 B2 | 8/2015 | Izozaki |
| 9,210,156 B1 | 12/2015 | Little |
| 9,219,732 B2 | 12/2015 | Baghdassaryan |
| 9,225,695 B1 | 12/2015 | Riera |
| 9,350,539 B2 | 5/2016 | Veugen |
| 9,392,460 B1 | 7/2016 | Blake |
| 9,419,951 B1 | 8/2016 | Felsher et al. |
| D765,669 S | 9/2016 | Shaw |
| 9,485,237 B1 | 11/2016 | Johansson |
| 9,615,066 B1 | 4/2017 | Tran |
| 9,665,169 B1 | 5/2017 | Dai |
| 9,706,406 B1 | 7/2017 | Adams |
| D800,764 S | 10/2017 | Thoreson |
| 9,854,218 B2 | 12/2017 | Mardikar |
| D813,884 S | 3/2018 | Penker |
| 9,959,694 B2 | 5/2018 | Lindsay |
| 9,961,547 B1 | 5/2018 | Molina-Markham |
| 10,019,561 B1 | 7/2018 | Shelton |
| 10,200,364 B1 | 2/2019 | Ketharaju et al. |
| D847,857 S | 5/2019 | Elatta |
| 10,374,800 B1 | 8/2019 | Sharfi |
| 10,402,800 B2 | 9/2019 | Lucas |
| 10,404,458 B1 | 9/2019 | Yamada |
| 10,430,789 B1 | 10/2019 | Herald, Jr. |
| 10,432,605 B1 | 10/2019 | Lester |
| 10,437,975 B1 | 10/2019 | Shelton |
| 10,521,223 B1 | 12/2019 | Bogushefsky, III |
| 10,559,307 B1 | 2/2020 | Khalegi |
| 10,630,467 B1 | 4/2020 | Gilbert |
| 10,674,446 B1 | 6/2020 | Trent |
| 10,769,633 B2 | 9/2020 | Dua |
| 10,810,290 B2 | 10/2020 | Minter et al. |
| 10,867,021 B1 | 12/2020 | Shelton |
| 10,887,307 B1 | 1/2021 | Newstadt |
| 10,911,425 B1 | 2/2021 | Hitchcock |
| 10,958,424 B1 | 3/2021 | Chhabra |
| D916,890 S | 4/2021 | Nagpal |
| 10,970,607 B2 | 4/2021 | Guangtao |
| 11,005,839 B1 | 5/2021 | Shahidzadeh |
| 11,030,618 B1 | 6/2021 | Budko |
| 11,038,694 B1 | 6/2021 | Kleinman |
| D925,602 S | 7/2021 | Xu |
| D928,803 S | 8/2021 | Faller |
| D928,820 S | 8/2021 | Bodduluri |
| 11,121,878 B2 | 9/2021 | McCarty |
| D942,469 S | 2/2022 | Abdullah et al. |
| 11,283,835 B1 | 3/2022 | Gordon |
| 11,328,042 B2 | 5/2022 | Keith, Jr. |
| 11,510,172 B1 | 11/2022 | Feng |
| 11,553,337 B2 | 1/2023 | Keith, Jr. |
| 11,563,582 B2 | 1/2023 | Keith, Jr. |
| 11,574,045 B2 | 2/2023 | Keith, Jr. |
| 11,588,794 B2 | 2/2023 | Keith, Jr |
| 11,637,694 B2 | 4/2023 | Slamov |
| 11,640,602 B2 | 5/2023 | Rudko |
| 11,652,815 B2 | 5/2023 | Keith, Jr. |
| 11,657,140 B2 | 5/2023 | Keith, Jr. |
| 2002/0099955 A1 | 7/2002 | Peled et al. |
| 2002/0114454 A1 | 8/2002 | Hamilton |
| 2002/0131592 A1 | 9/2002 | Hinnant |
| 2002/0169871 A1 | 11/2002 | Cravo de Almeida |
| 2003/0014750 A1 | 1/2003 | Kamen |
| 2003/0016844 A1 | 1/2003 | Numaoka |
| 2003/0021416 A1 | 1/2003 | Brown |
| 2003/0147267 A1 | 8/2003 | Huttunen |
| 2003/0174067 A1 | 9/2003 | Soliman |
| 2003/0221030 A1 | 11/2003 | Pontius |
| 2004/0198392 A1 | 10/2004 | Harvey |
| 2004/0223616 A1 | 11/2004 | Kocarev |
| 2005/0135609 A1 | 6/2005 | Lee |
| 2005/0147240 A1 | 7/2005 | Agrawal |
| 2006/0075060 A1 | 4/2006 | Clark |
| 2006/0031301 A1 | 9/2006 | Herz et al. |
| 2006/0196950 A1 | 9/2006 | Killccote |
| 2006/0236408 A1 | 10/2006 | Yan |
| 2006/0285544 A1 | 12/2006 | Taylor |
| 2008/0022141 A1 | 1/2008 | Hammarlund |
| 2008/0031460 A1 | 2/2008 | Brookner |
| 2008/0045218 A1 | 2/2008 | Okochi |
| 2008/0165937 A1 | 7/2008 | Moore |
| 2008/0301057 A1 | 12/2008 | Oren |
| 2009/0006796 A1 | 1/2009 | Chang |
| 2009/0090577 A1 | 4/2009 | Takahashi |
| 2009/0161873 A1 | 6/2009 | Simard |
| 2009/0194592 A1 | 8/2009 | Ming et al. |
| 2009/0279693 A1 | 11/2009 | Billet |
| 2009/0315671 A1 | 12/2009 | Gocho |
| 2009/0327746 A1 | 12/2009 | Greco |
| 2010/0079591 A1 | 4/2010 | Lee |
| 2010/0100716 A1 | 5/2010 | Scott |
| 2010/0122274 A1 | 5/2010 | Gillies |
| 2010/0329232 A1 | 12/2010 | Tubb |
| 2011/0072142 A1 | 3/2011 | Herz et al. |
| 2011/0106935 A1 | 5/2011 | Srinivasan |
| 2011/0167255 A1 | 7/2011 | Matzkel |
| 2011/0167273 A1 | 7/2011 | Maas |
| 2011/0187642 A1 | 8/2011 | Faith |
| 2011/0194694 A1 | 8/2011 | Struik |
| 2011/0231673 A1 | 9/2011 | Alekseev |
| 2011/0233284 A1 | 9/2011 | Howard |
| 2011/0302405 A1 | 12/2011 | Marlow |
| 2011/0321052 A1 | 12/2011 | Long |
| 2012/0098750 A1 | 4/2012 | Allen |
| 2012/0185910 A1 | 7/2012 | Miettinen |
| 2012/0214442 A1 | 8/2012 | Crawford |
| 2012/0221859 A1 | 8/2012 | Marien |
| 2012/0272058 A1 | 10/2012 | Wang et al. |
| 2012/0281885 A1 | 11/2012 | Syrdal |
| 2013/0086625 A1 | 4/2013 | Driscoll |
| 2013/0111208 A1 | 5/2013 | Sabin et al. |
| 2013/0170363 A1 | 7/2013 | Millington |
| 2013/0177151 A1 | 7/2013 | Sella |
| 2013/0202104 A1 | 8/2013 | Ghouti |
| 2013/0205410 A1 | 8/2013 | Sambamurthy |
| 2013/0239191 A1 | 9/2013 | Bostick |
| 2013/0243187 A1 | 9/2013 | Hortsmeyer |
| 2014/0002481 A1 | 1/2014 | Broughton |
| 2014/0007048 A1 | 1/2014 | Qureshi |
| 2014/0038583 A1 | 2/2014 | Berg |

(56) References Cited

U.S. PATENT DOCUMENTS

| | | |
|---|---|---|
| 2014/0039892 A1 | 2/2014 | Mills |
| 2014/0040628 A1 | 2/2014 | Fort et al. |
| 2014/0064166 A1 | 3/2014 | HomChadhuri |
| 2014/0098723 A1 | 4/2014 | Battista |
| 2014/0108803 A1 | 4/2014 | Probert |
| 2014/0201531 A1 | 7/2014 | Toy |
| 2014/0244514 A1 | 8/2014 | Rodriguez |
| 2014/0244515 A1 | 8/2014 | Garfinkle |
| 2014/0278077 A1 | 9/2014 | Levin |
| 2014/0304371 A1 | 10/2014 | Mraz |
| 2014/0351618 A1 | 11/2014 | Connell |
| 2014/0368601 A1 | 12/2014 | deCharms |
| 2015/0089568 A1 | 3/2015 | Sprague |
| 2015/0095580 A1 | 4/2015 | Liu |
| 2015/0095648 A1 | 4/2015 | Nix |
| 2015/0095986 A1 | 4/2015 | Karpey |
| 2015/0134963 A1 | 5/2015 | Izu |
| 2015/0142666 A1 | 5/2015 | Landrok |
| 2015/0242601 A1 | 8/2015 | Griffiths |
| 2015/0242605 A1 | 8/2015 | Du |
| 2015/0258892 A1 | 9/2015 | Wu |
| 2015/0271679 A1 | 9/2015 | Park |
| 2015/0278805 A1 | 10/2015 | Spencer, III |
| 2015/0280911 A1 | 10/2015 | Andoni |
| 2015/0294092 A1 | 10/2015 | Balasubramanian |
| 2015/0347734 A1 | 12/2015 | Beigi |
| 2015/0350201 A1 | 12/2015 | Cornell |
| 2015/0356289 A1 | 12/2015 | Brown |
| 2015/0365229 A1 | 12/2015 | Patey |
| 2015/0365235 A1 | 12/2015 | Hostyn |
| 2015/0370826 A1 | 12/2015 | Mraz |
| 2015/0373007 A1 | 12/2015 | Sheller |
| 2016/0007288 A1 | 1/2016 | Samardzija |
| 2016/0011224 A1 | 1/2016 | Pollack |
| 2016/0057623 A1 | 2/2016 | Dutt |
| 2016/0065558 A1 | 3/2016 | Suresh |
| 2016/0065570 A1 | 3/2016 | Spencer |
| 2016/0098334 A1 | 4/2016 | Harihharakrishnan |
| 2016/0110528 A1 | 4/2016 | Gupta |
| 2016/0117673 A1 | 4/2016 | Landrock |
| 2016/0135107 A1 | 5/2016 | Hampel |
| 2016/0180078 A1 | 6/2016 | Chhabra |
| 2016/0182503 A1 | 6/2016 | Cheng |
| 2016/0191499 A1 | 6/2016 | Momchillov |
| 2016/0283406 A1 | 6/2016 | Linga |
| 2016/0227411 A1 | 8/2016 | Lundblade |
| 2016/0239649 A1 | 8/2016 | Zhao |
| 2016/0239657 A1 | 8/2016 | Loughlin-McHugh et al. |
| 2016/0320831 A1 | 11/2016 | McCubbin |
| 2016/0342873 A1 | 11/2016 | Winkk et al. |
| 2016/0352696 A1* | 12/2016 | Essigmann ............. H04W 4/24 |
| 2017/0005995 A1 | 1/2017 | Yang |
| 2017/0013453 A1 | 1/2017 | Lee |
| 2017/0041309 A1 | 2/2017 | Ekambaram et al. |
| 2017/0048062 A1 | 2/2017 | Polak |
| 2017/0063528 A1 | 3/2017 | Seo |
| 2017/0068994 A1 | 3/2017 | Slomkowski |
| 2017/0070340 A1 | 3/2017 | Hibshoosh |
| 2017/0070890 A1 | 3/2017 | Luff |
| 2017/0085382 A1 | 3/2017 | Kamakari |
| 2017/0124385 A1 | 5/2017 | Ganong |
| 2017/0147345 A1 | 5/2017 | Clevenger |
| 2017/0193211 A1 | 7/2017 | Blake |
| 2017/0220407 A1 | 8/2017 | Estrada |
| 2017/0230172 A1 | 8/2017 | Andersson |
| 2017/0230344 A1* | 8/2017 | Dhar ...................... H04L 9/088 |
| 2017/0264597 A1 | 9/2017 | Pizot |
| 2017/0272419 A1 | 9/2017 | Kumar |
| 2017/0289168 A1 | 10/2017 | Bar |
| 2017/0295010 A1 | 10/2017 | Shibutani |
| 2017/0310479 A1* | 10/2017 | Sato ...................... H04L 9/0861 |
| 2017/0311250 A1 | 10/2017 | Rico Alvarino |
| 2017/0317823 A1 | 11/2017 | Gandhi |
| 2017/0339118 A1 | 11/2017 | Hwang |
| 2017/0366514 A1 | 12/2017 | Malka |
| 2018/0005239 A1 | 1/2018 | Schlesinger |
| 2018/0005465 A1 | 1/2018 | Truong |
| 2018/0007530 A1 | 1/2018 | Tanaka |
| 2018/0012003 A1 | 1/2018 | Asulin |
| 2018/0025135 A1 | 1/2018 | Odom |
| 2018/0027411 A1 | 1/2018 | Taneja |
| 2018/0029560 A1 | 2/2018 | Mohaupt |
| 2018/0039990 A1 | 2/2018 | Lindermann |
| 2018/0046803 A1 | 2/2018 | Li |
| 2018/0063784 A1 | 3/2018 | Abraham |
| 2018/0109696 A1 | 4/2018 | Thanigasalam |
| 2018/0114221 A1 | 4/2018 | Karantzis |
| 2018/0135815 A1 | 5/2018 | Rowles |
| 2018/0144615 A1 | 5/2018 | Kinney |
| 2018/0150622 A1 | 5/2018 | Zaitsev |
| 2018/0167816 A1 | 6/2018 | Kusens et al. |
| 2018/0189160 A1 | 7/2018 | Yasin |
| 2018/0189161 A1 | 7/2018 | Yasin |
| 2018/0212770 A1 | 7/2018 | Costa |
| 2018/0248865 A1 | 8/2018 | Johansson |
| 2018/0285879 A1 | 10/2018 | Gadnis |
| 2018/0302416 A1 | 10/2018 | Einberg |
| 2018/0322266 A1 | 11/2018 | Kwok |
| 2018/0329857 A1 | 11/2018 | Ko |
| 2018/0375848 A1 | 12/2018 | Tunnell |
| 2019/0103957 A1 | 4/2019 | Isobe |
| 2019/0122024 A1 | 4/2019 | Schwartz |
| 2019/0149333 A1 | 5/2019 | harnik |
| 2019/0188111 A1 | 6/2019 | Ozog |
| 2019/0289017 A1 | 6/2019 | Agarwal |
| 2019/0207918 A1 | 7/2019 | Kurian |
| 2019/0220583 A1 | 7/2019 | Douglas |
| 2019/0245704 A1 | 8/2019 | Pala |
| 2019/0268774 A1 | 8/2019 | Kusens et al. |
| 2019/0271349 A1 | 9/2019 | Madru |
| 2019/0271578 A1 | 9/2019 | Moeller |
| 2019/0272495 A1 | 9/2019 | Moeller |
| 2019/0279204 A1 | 9/2019 | Norton |
| 2019/0281025 A1 | 9/2019 | Harriman |
| 2019/0281036 A1 | 9/2019 | Eisen |
| 2019/0287427 A1 | 9/2019 | Schepers |
| 2019/0318122 A1 | 10/2019 | Hockey |
| 2019/0334708 A1* | 10/2019 | Carpov ................. H04L 9/3093 |
| 2019/0342092 A1 | 11/2019 | Handschuh |
| 2019/0386814 A1* | 12/2019 | Ahmed ................... H04L 9/008 |
| 2020/0042723 A1 | 2/2020 | Krishnamoorthy |
| 2020/0050745 A1 | 2/2020 | Kim |
| 2020/0053096 A1 | 2/2020 | Bendersky |
| 2020/0066071 A1 | 2/2020 | Budman |
| 2020/0097643 A1 | 3/2020 | Uzun |
| 2020/0099675 A1 | 3/2020 | Mardiks Rappaport |
| 2020/0100115 A1 | 3/2020 | Skaaksrud |
| 2020/0120071 A1 | 4/2020 | Wimmer |
| 2020/0125704 A1 | 4/2020 | Chavez |
| 2020/0127974 A1 | 4/2020 | Morlando |
| 2020/0134145 A1 | 4/2020 | Bapst |
| 2020/0162435 A1 | 5/2020 | Kubo |
| 2020/0175157 A1 | 6/2020 | Wilding |
| 2020/0193051 A1 | 6/2020 | Van Antwerp |
| 2020/0242417 A1 | 7/2020 | Sagi |
| 2020/0358787 A1 | 11/2020 | Barker |
| 2020/0038769 A1 | 12/2020 | Kushwah |
| 2020/0403787 A1 | 12/2020 | Islam |
| 2020/0403992 A1 | 12/2020 | Huffman |
| 2021/0005224 A1 | 1/2021 | Rothschild |
| 2021/0014314 A1 | 1/2021 | Yamada |
| 2021/0049032 A1 | 2/2021 | White |
| 2021/0051015 A1 | 2/2021 | Widmann |
| 2021/0051177 A1 | 2/2021 | White |
| 2021/0123835 A1 | 4/2021 | Glennon |
| 2021/0152417 A1 | 5/2021 | Baird |
| 2021/0152554 A1 | 5/2021 | Taft |
| 2021/0167946 A1 | 6/2021 | Bitan |
| 2021/0173906 A1 | 6/2021 | Keith, Jr. |
| 2021/0173907 A1 | 6/2021 | Keith, Jr. |
| 2021/0173914 A1 | 6/2021 | Keith, Jr. |
| 2021/0173915 A1 | 6/2021 | Keith, Jr. |
| 2021/0173949 A1 | 6/2021 | Keith, Jr. |
| 2021/0174333 A1 | 6/2021 | Keith, Jr. |

(56) References Cited

U.S. PATENT DOCUMENTS

| | | |
|---|---|---|
| 2021/0176064 A1 | 6/2021 | Keith, Jr. |
| 2021/0176066 A1 | 6/2021 | Keith, Jr. |
| 2021/0176218 A1 | 6/2021 | Keith, Jr. |
| 2021/0176223 A1 | 6/2021 | Falk |
| 2021/0176235 A1 | 6/2021 | Keith, Jr. |
| 2021/0176633 A1 | 6/2021 | Keith, Jr. |
| 2021/0194608 A1 | 6/2021 | Yao |
| 2021/0200852 A1 | 7/2021 | Gupta |
| 2021/0250759 A1 | 8/2021 | Ziv |
| 2021/0297258 A1 | 9/2021 | Keith, Jr. |
| 2021/0297448 A1 | 9/2021 | Keith, Jr. |
| 2021/0297455 A1 | 9/2021 | Keith, Jr. |
| 2021/0350918 A1 | 11/2021 | Paul |
| 2021/0362750 A1 | 11/2021 | Yang |
| 2021/0390537 A1 | 12/2021 | Budko et al. |
| 2022/0027447 A1 | 1/2022 | Keith, Jr. |
| 2022/0028200 A1 | 1/2022 | Keith, Jr. |
| 2022/0030022 A1 | 1/2022 | Keith, Jr. |
| 2022/0036905 A1 | 2/2022 | Keith, Jr. |
| 2022/0038895 A1 | 2/2022 | Keith, Jr. |
| 2022/0038897 A1 | 2/2022 | Liu |
| 2022/0043913 A1 | 2/2022 | Keith, Jr. |
| 2022/0045841 A1 | 2/2022 | Keith, Jr. |
| 2022/0092161 A1 | 3/2022 | Keith, Jr. |
| 2022/0092162 A1 | 3/2022 | Keith, Jr. |
| 2022/0092163 A1 | 3/2022 | Keith, Jr. |
| 2022/0092164 A1 | 3/2022 | Keith, Jr. |
| 2022/0092165 A1 | 3/2022 | Keith, Jr. |
| 2022/0093256 A1 | 3/2022 | Keith, Jr. et al. |
| 2022/0094545 A1 | 3/2022 | Islamov et al. |
| 2022/0094550 A1 | 3/2022 | Keith, Jr. |
| 2022/0108026 A1 | 4/2022 | Ortiz et al. |
| 2022/0130501 A1 | 4/2022 | Keith, Jr. et al. |
| 2022/0138300 A1 | 5/2022 | Manjunath et al. |
| 2022/0139546 A1 | 5/2022 | Manjunath et al. |
| 2022/0164424 A1 | 5/2022 | Keith, Jr. |
| 2022/0197985 A1 | 6/2022 | Keith, Jr. |
| 2022/0200971 A1 | 6/2022 | Vigneswaran |
| 2022/0229888 A1 | 7/2022 | Keith, Jr. |
| 2022/0286966 A1 | 9/2022 | Zhao |
| 2022/0382844 A1 | 12/2022 | Keith, Jr. |
| 2022/0385458 A1 | 12/2022 | Keith, Jr. |
| 2022/0394023 A1 | 12/2022 | Keith, Jr. |
| 2022/0394464 A1 | 12/2022 | Keith, Jr. |
| 2022/0394465 A1 | 12/2022 | Keith, Jr. |
| 2023/0096233 A1 | 3/2023 | Islamov et al. |
| 2023/0106024 A1 | 4/2023 | Keith, Jr. |
| 2023/0107624 A1 | 4/2023 | Keith, Jr. |
| 2023/0114650 A1 | 4/2023 | Keith, Jr. |
| 2023/0116527 A1 | 4/2023 | Keith, Jr. et al. |
| 2023/0185896 A1 | 6/2023 | Keith, Jr. |
| 2023/0198766 A1 | 6/2023 | Keith, Jr. et al. |
| 2023/0198962 A1 | 6/2023 | Keith, Jr. |
| 2023/0254120 A1 | 8/2023 | Islamov |
| 2023/0254121 A1 | 8/2023 | Islamov |
| 2023/0254122 A1 | 8/2023 | Islamov |
| 2023/0267454 A1 | 8/2023 | Budko |
| 2023/0283602 A1 | 9/2023 | Keith, Jr. et al. |
| 2023/0289431 A1 | 9/2023 | Keith, Jr. |

FOREIGN PATENT DOCUMENTS

| | | |
|---|---|---|
| CN | 106413128 B | 7/2020 |
| EP | 3276561 A | 1/2018 |
| EP | 3457344 A1 | 3/2019 |
| WO | 2016179433 A1 | 11/2016 |
| WO | 2020065132 A1 | 4/2020 |
| WO | 2020092542 A1 | 5/2020 |
| WO | 2021119187 A1 | 7/2021 |

OTHER PUBLICATIONS

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report mailed Aug. 11, 2016, for PCT Application No. PCT/US2016/031055, filed May 5, 2016, five pages.

International Search Report mailed Oct. 9, 2019, for PCT Application No. PCT/US2019/041871, filed Jul. 15, 2019, four pages.

Li et al., "Addressable Metasurfaces for Dynamic Holography and Optical Information Encryption", Jun. 15, 2018, http://advances.sciencemag.org/content/advances/4/6/eaar6768.full.pdf.

The International Search Report and Written Report for the International Application No. PCT/US2020/064099 dated Mar. 16, 2021.

Bywater Films, "Winkk: Emotion to Action." Vimeo, published Oct. 7, 2015 (Retrieved from the Internet Mar. 22, 2021). Internet URL: <https://vimeo.com/141695923> (Year: 2015).

Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).

International Report on Patentability from International Application No. PCT/US2020/064099, mailed on Jun. 23, 2022, 7 pages.

Magoon, Owais, "iOS app." Behance published Sep. 7, 2015 (Retrieved from the Internet Mar. 22, 2021). Internet URL: <https://www.behance.net/gallery/27383661/iOS-app> (Year: 2015).

Tao et al., "Simple Matrix—A Multivariate Public Key Cryptosystem (MPKC) for Encryption" from Finite Field and Their Applications vol. 35, Sep. 2015, pp. 352-368 (Year 2015).

\* cited by examiner

SECRET MATERIAL EXCHANGE AND AUTHENTICATION CRYPTOGRAPHY OPERATIONS

CROSS-REFERENCE TO RELATED APPLICATION(S)

This application is a divisional application of co-pending application Ser. No. 17/040,949, entitled "SECRET MATERIAL EXCHANGE AND AUTHENTICATION CRYPTOGRAPHY OPERATIONS," filed on Sep. 23, 2020, which claims priority to PCT Application No. PCT/US2019/041871, filed on Jul. 15, 2019, and titled "SECRET MATERIAL EXCHANGE AND AUTHENTICATION CRYPTOGRAPHY OPERATIONS," which claims priority under 35 U.S.C. 119 (e) to the U.S. provisional patent application, Application No. 62/698,644, filed on Jul. 16, 2018, and entitled "SECRET MATERIAL EXCHANGE AND AUTHENTICATION CRYPTOGRAPHY OPERATIONS," which are all hereby incorporated by reference in their entirety for all purposes.

BACKGROUND

Cryptography is related to the study of protocols, techniques, and approaches that prevent third parties from accessing, reading, and/or interpreting secret data. Cryptography can be applied to various processes in information security, such as data integrity and encryption, confidentiality, authentication, verification, and non-repudiation. Thus, cryptography has several applications in various fields, including data encryption and privacy, computer network communications and transaction processing, and computing system security and integrity.

Modern cryptography often relies upon computational hardness in mathematical theory. In other words, it might be theoretically possible to break certain cryptographic systems, but the time required to do so makes such cryptographic-defeating processes intractable. Typically, computationally-secure cryptography processes are preferable to those which are easier to defeat. At the same time, however, computationally-secure cryptography processes might be more computationally-intensive to implement and, thus, more time consuming and costly. In that context, although some cryptographic processes, such as a one time pad, cannot be broken or defeated even with unlimited computing power, those schemes are more difficult to implement than a good, theoretically-breakable but computationally secure approach. As such, modern computing devices may exchange secret data using cryptographic processes having security problems (e.g., the processes are susceptible to brute force attack). At the same time, those cryptographic processes may be resource intensive (e.g., the processes are computationally-intensive to implement).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, cryptography is related to the study of protocols, techniques, and approaches that prevent third parties from accessing, reading, and/or interpreting secret data. In the context of cryptography, the Rivest-Shamir-Adleman (RSA) cryptosystem, elliptic curve cryptography (ECC) cryptosystem, and other asymmetrical (and symmetrical) methods of secure key exchange have security problems. Those cryptosystems are based on complexity and can, theoretically, be decrypted.

In contrast to the RSA, ECC, and other cryptosystems, the cryptographic processes described herein is more immune to cryptanalysis and permits the sharing of secret data, such as symmetric keys and other secret data, over public networks. The cryptographic system can also be used for authentication. No known methods of traditional or quantum computing can be used to circumvent the cryptographic approaches described herein. The cryptographic system described herein was developed to achieve a number of goals including (1) securely exchanging cryptographic keys over public networks, (2) information ciphering, authentication, and (4) encryption for public networks that is secure against standard and quantum computing.

In the context described herein, white noise can be defined as (or can include) a sequence of independent random variables (e.g., discrete numbers) with a uniform probability distribution. Polynomial white noise can be defined as (or can include) a sequence of polynomial function values composed by independent random variables (e.g., discrete numbers) with a uniform probability distribution.

No known algorithm can decrypt the operations described herein due, at least in part, to the use of white noise randomization. The unknown independent variables appear to third parties as random white noise and, thus, there is no correlation between those variables and any information being transferred. As one example, the key exchange method or process described herein can be shown as an exchange of matrices with a corresponding number of different unknown independent variables and visible values. The number of unknown independent variables always exceeds the number of visible independent values in any combination of subsets of matrices. Further, the number of unknown variables exceeds the number of publically visible polynomial functions. Additionally, no inverse polynomial functions can be determined without information about the secret key—even if the plain text of the secret key is known by a third party.

Figure 1:
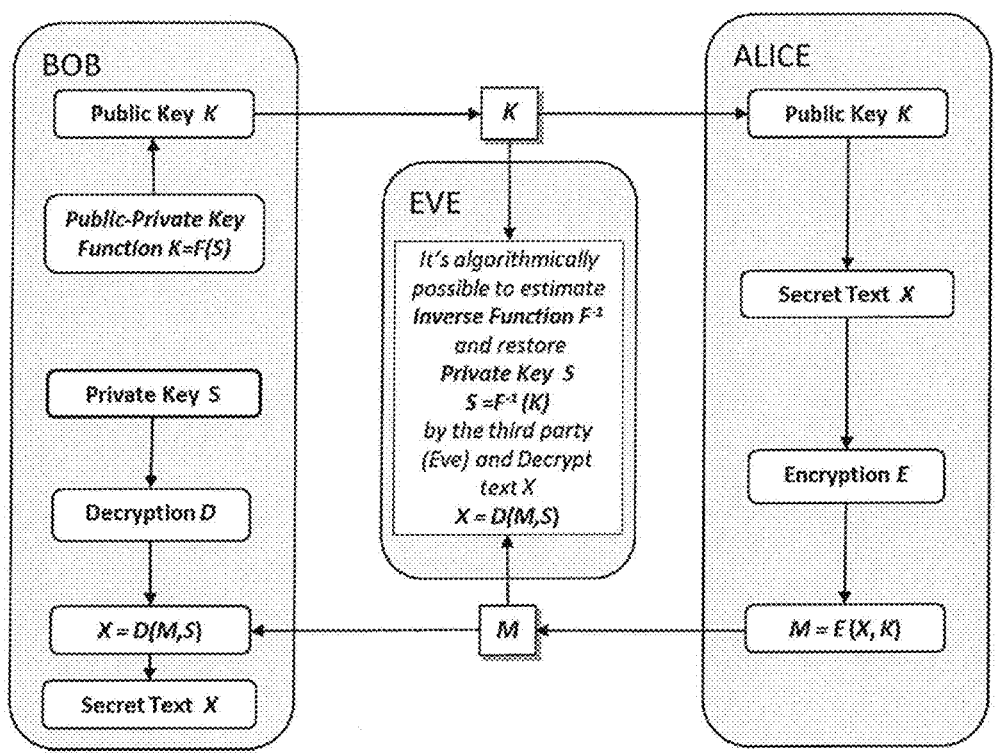
FIG. 1 illustrates a process of secret text transfer using asymmetric keys.

Turning to the drawings, FIG. 1 illustrates a process of secret text transfer using asymmetric keys. In the example shown in FIG. 1, Alice wishes to communicate secret text to Bob over a public network, such as the Internet, and Eve is the eavesdropper. To communicate the secret text, which can be a symmetric key or any other secret information, Alice and Bob use asymmetric cryptography. Asymmetric cryptography relies upon a key pair including a public key that can be disseminated to third parties (e.g., Alice) and a private key which is kept private (e.g., by Bob). In an asymmetric cryptography system, any person can encrypt a message using the public key, and that encrypted message can only be decrypted using the private key. The strength of asymmetric cryptography relies on the degree of difficulty (e.g., computational impracticality) for a private key to be determined from its associated public key. Asymmetric cryptography also depends on keeping the private key private.

Referring back to FIG. 1, Alice obtains a copy of a public key from Bob (or any other source). Alice encrypts the secret text using the public key to produce the encrypted secret text and communicates it to Bob over the public network. Bob then decrypts the encrypted secret text using the private key to obtain the secret key. Over the public network, Eve can only see the encrypted secret text. Even if Eve obtains a copy of the encrypted secret text and the public key used to create it, Eve cannot obtain the secret text from the encrypted secret text using the public key. Instead, only the private key, which is securely held and protected by Bob, can be used to decrypt the encrypted secret text to obtain the secret text from Alice.

There are drawbacks and limitations to using asymmetric cryptography. For example, it is algorithmically possible to estimate (or determine) the private key in a key pair from the publicly available public key. Additionally, asymmetric key pairs are relatively difficult and time consuming to create, typically depending upon the identification of large prime numbers. Further, asymmetric cryptography can be vulnerable in that it may produce the same predictable encrypted output when the same secret text is encrypted.

To be distinguished from other cryptographic systems, various cryptography processes or operations are described herein. In one embodiment, a first cryptographic function is applied to secret data. The first cryptographic function operates as a type of cryptographic key and encrypts or ciphers the secret data to produce a first encrypted result. The first encrypted result can be securely transmitted by a first device to a second device. The second device then applies a second cryptographic function to the first encrypted result. Similar to the first cryptographic function, the second cryptographic function operates as a cryptographic key and further (or doubly) encrypts or ciphers the first encrypted result to produce a second (or doubly) encrypted result. At this point, the secret data has been encrypted by two different cryptographic functions, each of them being sufficient to secure the secret data. The two different cryptographic functions can then be inversed or removed, in any order, to reveal the secret data.

Figure 2:
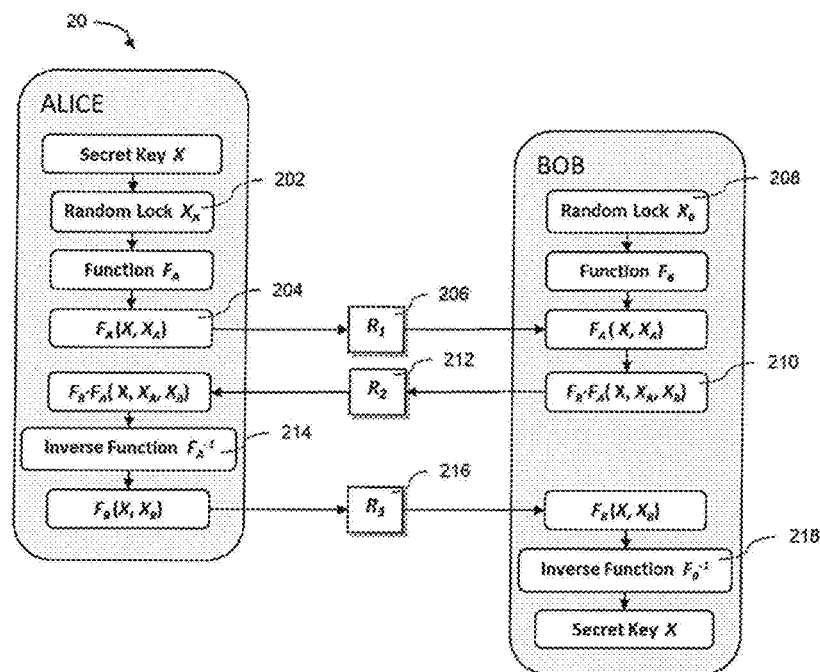
FIG. 2 illustrates a representative process of secret key transfer using cryptography processes according to various embodiments described herein.

Turning to the embodiments, FIG. 2 illustrates a representative process 20 of secret key transfer using cryptography processes according to various embodiments described herein. The process described below can be performed by any suitable computing device(s) including a processor and memory, without limitation. In the example shown in FIG. 2, Alice wants to securely pass the secret key X to Bob over a public network. To do so, Alice should first encrypt the secret key X before sending it to Bob.

To encrypt the secret key X, Alice holds a first cryptographic function $F_A$. In various embodiments, the cryptographic function $F_A$ can be embodied as any suitable mathematical function having an inverse which cannot be determined without knowledge of a certain set of parameters of the mathematical function. In one embodiment, the function $F_A$ can be embodied as a polynomial function or multivariate polynomial function defined in part by one or more variables, combinations of variables, combinations of variables at various powers, and coefficients. To undo or unlock (e.g., decrypt) the effect of the cryptographic function $F_A$, Alice also holds a first inverse cryptographic function $F^{-1}A$.

To start, at step 202, the process 20 includes Alice generating, with a first computing device, a first random lock $X_A$. The first random lock $X_A$ can be embodied as an array or vector of random scalar integers, for example, or another suitable organized structure of random numbers. In the process 20, the first random lock $X_A$ can operate as a type of initialization vector upon which the cryptographic function $F_A$ is applied in combination with the secret key X. For example, the first random lock $X_A$ helps to randomize the application of the cryptographic function $F_A$ creating, in effect, a new random cryptographic function $F_A$ for each different random lock $X_A$. In that context, the first random lock $X_A$ helps to achieve semantic security, so that repeated usage of the cryptographic function $F_A$ with the same operand does not produce the same ciphered result and does not allow an attacker to infer any information.

At step 204, the process 20 includes Alice applying, with the first computing device, the first cryptographic function $F_A$ to a combination of the secret key X and the first random lock $X_A$ to produce a first encrypted result $R_1$. Here, Alice's secret key X, which can include letters, numbers, American Standard Code for Information Interchange (ASCII) characters, etc., is ciphered with random numbers (i.e., the first random lock $X_A$) using the cryptographic operation or function $F_A$. The cryptographic function $F_A$ can be embodied as any suitable mathematical function, such as a polynomial or multivariate polynomial function. For example, the cryptographic function $F_A$ can be embodied as a polynomial function $F(CX^k)$ of kth order written as:

$$F(CX^k) = \sum_{i_1=1}^{k} \cdots \sum_{i_k=1}^{k} C_{i_1 i_2 \ldots i_k} \cdot X_{i_1} \cdot X_{i_2} \cdots X_{i_k}, \quad (1)$$

where $C_{i \ldots k}$ are coefficients of the polynomial function $F(CX^k)$, and $X_{i \ldots k}$ are combinations of the operand X, which can include a combination of a random lock and secret data.

Figure 3A:
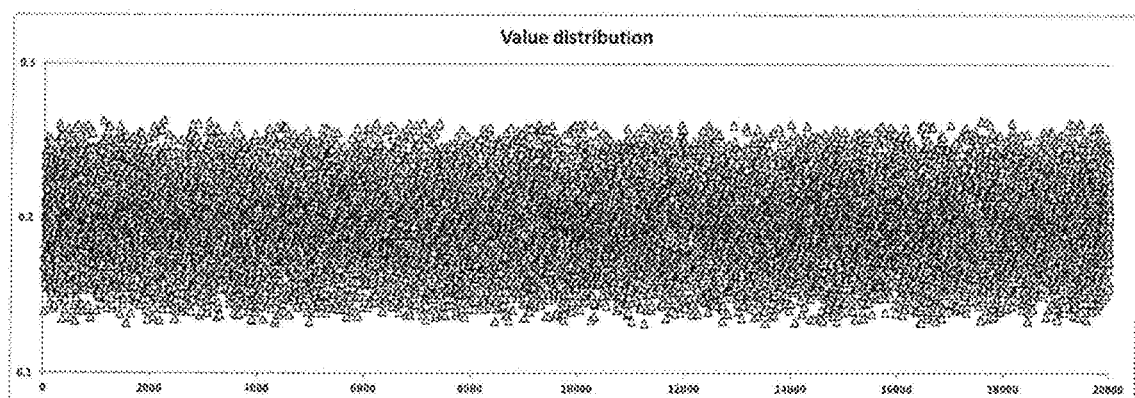
FIG. 3A illustrates an example distribution function of variables resulting from the white noise associative cryptography key operations according to various embodiments described herein.
Figure 3B:
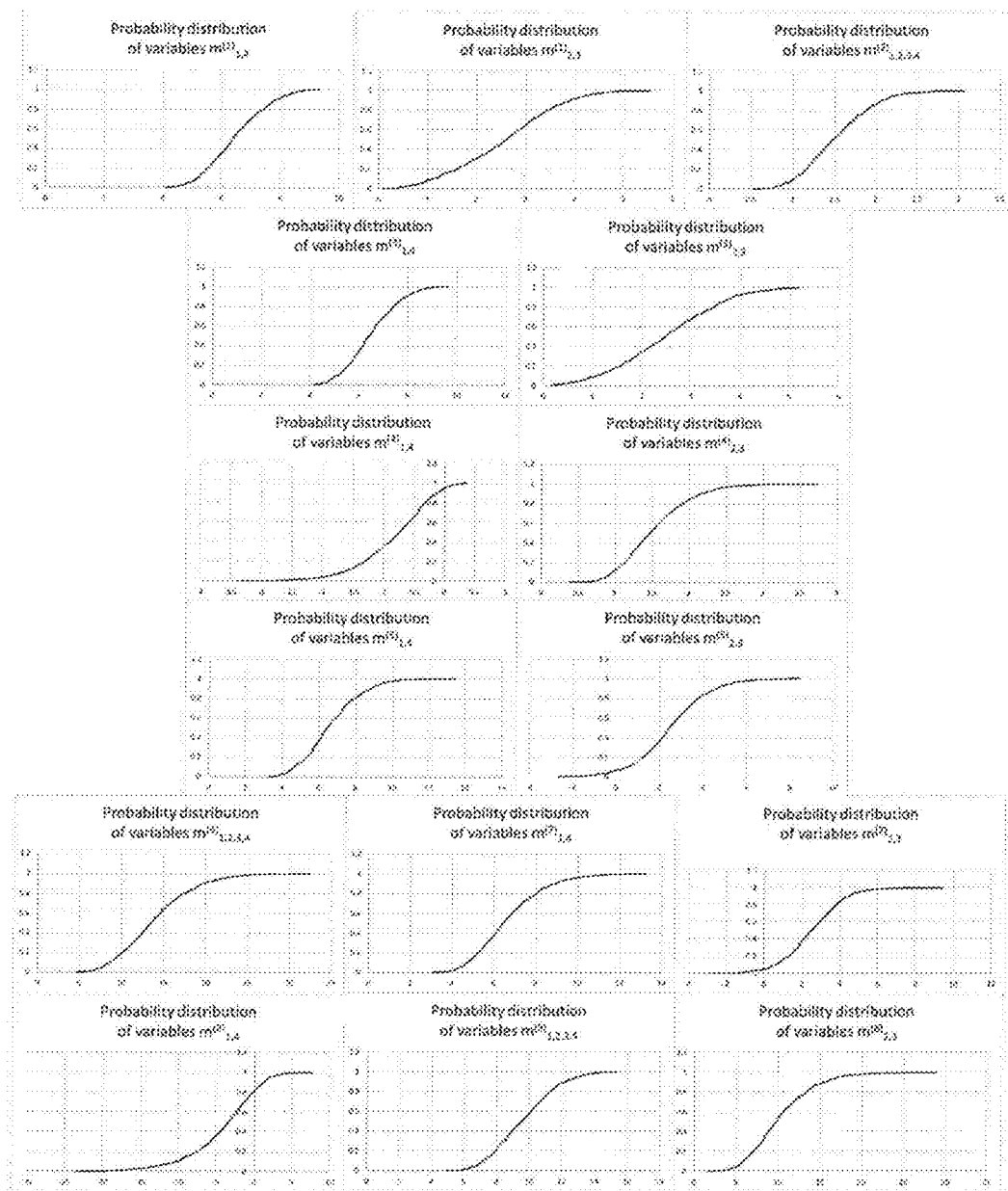
FIG. 3B illustrates example probability distribution functions of variables resulting from the white noise associative cryptography key operations according to various embodiments described herein.

Thus, at step 204, Alice's secret key X, which may include letters, numbers, American Standard Code for Information Interchange (ASCII) characters, etc., are ciphered with random numbers based on the first random lock $X_A$ and the first cryptographic function $F_A$. As an example, a distribution function of the variables in the results $R_1$, $R_2$, and $R_3$ is shown in FIG. 3A, and probability distribution functions of the variables in the results $R_1$, $R_2$, and $R_3$ is shown in FIG. 3B.

The structure of the polynomial function $F(CX^k)$ and the coefficients can be known to others (although they generally are not) from the formalization of the algorithm. However, even if the structure of the polynomial function F and values of the coefficients C, k are known to a third party, the third party still cannot decrypt the transferred information.

At step 206, the process 20 includes Alice transmitting, with the first computing device, the first encrypted result $R_1$ to Bob's second computing device. At step 208, the process 20 includes Bob generating, with the second computing device, a second random lock $X_B$. Similar to the first random lock $X_A$, the second random lock $X_B$ can be embodied as an array or vector of random scalar integers, for example, or another suitable organized structure of random numbers. In the process 20, the second random lock $X_S$ can also operate as a type of initialization vector for the cryptographic function $F_B$. For example, the second random lock $X_B$ helps to randomize the application of Bob's cryptographic function $F_B$ creating, in effect, a new random cryptographic function $F_B$ for each different random lock$_{XB}$. In that context, the second random lock $X_B$ helps to achieve semantic security, so that repeated usage of the cryptographic function $F_B$ with the same operand does not produce the same ciphered result and does not allow an attacker to infer any information.

At step 210, the process includes Bob applying, with the second computing device, Bob's cryptographic function $F_B$ to a combination of the first encrypted result $R_1$ and the second random lock $X_B$ to produce a second encrypted result $R_2$. Here, the first encrypted result $R_1$ (e.g., $F_A(X,X_A)$) is (doubly) ciphered with random numbers (i.e., the second random lock $X_B$) using the cryptographic operation or function $F_B$. The cryptographic function $F_B$ can be embodied as any suitable mathematical function, such as a polynomial or multivariate polynomial function. For example, the cryptographic function $F_B$ can be embodied as a polynomial function $F(CX^k)$ of kth order according to that shown above in Equation (1).

At this point, Alice's secret key X has been encrypted or ciphered by two different cryptographic functions $F_A$ and $F_B$, each of them being sufficient to secure the secret key X from others. The two different cryptographic functions can then be inversed or removed, in any order, to reveal the secret key X. In other words, to decrypt the secret key X from the second encrypted result $R_2$ (i.e., to undo the effects of the cryptographic functions $F_A$ and Fa) it is possible to either apply the inverse $F^{-1}_A$ function to $F_A$ or the inverse $F^{-1}_B$ function to $F_B$ first. Thus, according to one aspect of associative cryptography key operations described herein, the order in which the second encrypted result $R_2$ is applied to the inverse cryptographic functions $F^{-1}_A$ and $F^1_B$, does not impact the results of the decryption of secret key X from the second encrypted result $R_2$. Further, any number of cryptographic functions to $F_1 \ldots F_N$ can be applied to encrypt secret data in any order to produce an encrypted result $R_N$, and that encrypted result $R_N$ can be decrypted in any order using the inverse cryptographic functions $F^{-1}_1 \ldots F^{-1}_N$.

At step 212, the process 20 includes Bob transmitting, with the second computing device, the second encrypted result $R_2$ to the first computing device. At step 214, the process 20 includes Alice applying, with the first computing device, the first inverse cryptographic function $F^{-1}_A$ to the second encrypted result $R_2$ to produce the result $R_3$. The first inverse cryptographic function $F^{-1}_A$ unlocks or removes the effect of both the first random lock $X_A$ and the first cryptographic function $F_A$. Thus, the result $R_3$ is what remains of the second encrypted result $R_2$ after the effect of the first random lock $X_A$ and the first cryptographic function $F_A$ are undone or unlocked (e.g., $F_B(X,X_B)$). Thus the result $R_3$ is still encrypted, but only by Bob's second random lock $X_B$ and the second cryptographic function $F_B$, and the result $R_3$ can be securely transmitted over the public network.

At step 216, the process 20 includes Alice transmitting, with the first computing device, the result $R_3$ to the second computing device. Finally, at step 218, the process 20 includes Bob applying, with the second computing device, the second inverse cryptographic function $F^{-1}_B$ to the result $R_3$ to arrive at the secret key X.

At the end of the process 20, the secret key X has been securely communicated from Alice to Bob. In contrast to the asymmetric key process described above with reference to FIG. 1, key pairs are not used in the process 20.

The general idea embodied in the process 20 is based on certain features of the publically unknown vectors X and the publically available (potentially visible) vectors R. Particularly, the number of variables "n" of the vectors X $\{x_1, \ldots, x_n\}$ is always more than the number of variables "m" of the vectors R=$\{r_1, \ldots, r_m\}$, i.e., n>m. Thus, there are no known algorithms which give a definite decryption solution of the secret key X, based only on visible values of the vectors R in the public networks. From this point of view, the method is cryptanalysis resistant. To obtain the only solution $x_1, \ldots, x_n$ from the values $r_1, \ldots, r_m$ of the polynomial functions $F_A$ and $F_B$, the third party (e.g., outsider Eve) should have additional information about the structure of the random vectors $X_A$ and $X_B$, which are available for Alice and Bob only. For instance, from $x_1+x_2+x_3=r_1$, it is not possible for a third party to arrive at a single solution for $x_1$ with only the value of the variable $r_1$ being publically visible, because the additional information about the values of the variables $x_2+x_3$ are not known.

A comparison of the features of asymmetrical methods and the method described herein is give in Table 1 below.

TABLE 1

| Features | Public-Private Key Asymmetrical (RSA, ECC) | PWN Three Pass Method |
|---|---|---|
| Numbers | Prime Numbers | Any Random Numbers |
| Time to Develop New Key | Relatively More Costly | Negligible |
| Processing Time | Relatively More Costly | Negligible |
| Inverse Function From Public Key | Relatively Complex | Inverse Function Does Not Exist |
| Third Party Defeat | Possible | Never |
| Public Network Output For Constant Input | Constant, predictable | Random, unpredictable |

An example of the use of the method described herein is provided below. Using the method, plain text (as a letter or ASCII code of 256 numbers) is represented in ciphered text by three corresponding random numbers $r_1$, $r_2$ and $r_3$ which are calculated by a random generator. Table 2 shows an example of how the plain text "This is a plain text" appears in ciphered numbers.

TABLE 2

| Plain text | Ciphered text | | |
|---|---|---|---|
| text | $r_1$ | $r_2$ | $r_3$ |
| T | 0.001251 | 0.563585 | 0.003585 |
| h | 0.193304 | 0.808741 | 0.158307 |
| i | 0.585009 | 0.479873 | 0.28051 |

TABLE 2-continued

| Plain text | Ciphered text | | |
|---|---|---|---|
| text | $r_1$ | $r_2$ | $r_3$ |
| s | 0.350291 | 0.895962 | 0.313555 |
|   | 0.82284 | 0.746605 | 0.614412 |
| i | 0.174108 | 0.858943 | 0.151801 |
| s | 0.710501 | 0.513535 | 0.363394 |
|   | 0.303995 | 0.014985 | 0.006167 |
| a | 0.091403 | 0.364452 | 0.035009 |
|   | 0.147313 | 0.165899 | 0.02575 |
| p | 0.988525 | 0.445692 | 0.438709 |
| l | 0.119083 | 0.004669 | 0.001204 i |
| a | 0.008911 | 0.37788 | 0.005292 |
| i | 0.531663 | 0.571184 | 0.303183 |
| n | 0.601764 | 0.607166 | 0.363988 |
|   | 0.166234 | 0.663045 | 0.113037 |
| t | 0.450789 | 0.352123 | 0.159469 |
| e | 0.057039 | 0.607685 | 0.037377 |
| x | 0.783319 | 0.802606 | 0.623152 |
| t | 0.519883 | 0.30195 | 0.157851 |

Uniform distribution is called "white noise" due to its informative features. For the letter 'A' (ASCII code 65), as one example, the random numbers may appear over the public net as $r_1=0.001251$, $r_2=0.563585$, $r_3=0.560746$ or $r_1=0.585009$, $r_2=0.479873$, $r_3=0.105796$ and every time the random variables $r_1$, $r_2$, $r_3$ will be unpredictable. The correlation function between any two variables x and y is estimated as follows:

$$\text{corr}(x, y) = \frac{\sum(x-\bar{x})(y-\bar{y})}{\sqrt{\sum(x-\bar{x})^2 \sum(y-\bar{y})^2}}. \quad (2)$$

The results of correlation function evaluation for pairs ($r_1$, $r_2$), ($r_2$, $r_3$) and ($r_1$, $r_3$) are given in Table 3 below.

TABLE 3

| corr ($r_1$, $r_2$) | corr ($r_2$, $r_3$) | corr ($r_1$, $r_3$) |
|---|---|---|
| −0.013927 | −0.002873 | −0.010771 |

The correlation is negligibly small, which means that ciphered information is encapsulated into white noise and is not analyzable by a third party. There are no known algorithms to decrypt the ciphered information without the encryption key.

In the approaches described herein, there are neither restrictions nor requirements on the encryption key number and length. All keys are equal in terms of crypt analysis resistance. Additionally, there are no correlations between the plain text and the ciphered random numbers ($r_1$, $r_2$, $r_3$), as the combinations of them are unpredictable. There are no known algorithms which can decrypt ciphered random numbers ($r_1$, $r_2$, $r_3$) into plain text without the key. There are no known algorithms which can recalculate the encryption key using visible ciphered random numbers ($r_1$, $r_2$, $r_3$) and visible plain text. There is no need for rotation of encryption keys if a physical, completely unpredictable random number generator is used. The series repetition period of real random numbers ($r_1$, $r_2$, $r_3$) is infinite.

Computational time needed to encrypt and decrypt data by the method described herein is significantly smaller than commonly used algorithms. Since the method uses polynomial functions, the transaction of numbers (or ASCII) should be controlled by calculation procedures. The analysis of 25,600,000 transactions demonstrates that the final error of the secret key value estimate does not exceed 0.001%. This means that, for example, the transaction of the letter 'A,' which is represented by the integer number 65 (ASCII), after all transformations from client to server could be calculated to be a number about 64.9999 (and depends in part on the random generator variables during the transaction).

A comparison of the features of a standard symmetrical method and the method described herein are given in Table 4 below.

TABLE 4

| Features | Symmetrical FIPS Pub 197 | WNT One Pass Transaction (in combination with Three Pass Transaction) |
|---|---|---|
| Encryption Key Rotation | Must Have | Not Needed |
| Processing time | Costly | Negligible |
| Security resistance and key length | Strong relation | No Relation |
| Hack | Costly | Never (Potentially Impossible) |
| Public net output for constant input (without key rotation) | Constant, Predictable | Random, Unpredictable |

Figure 4:
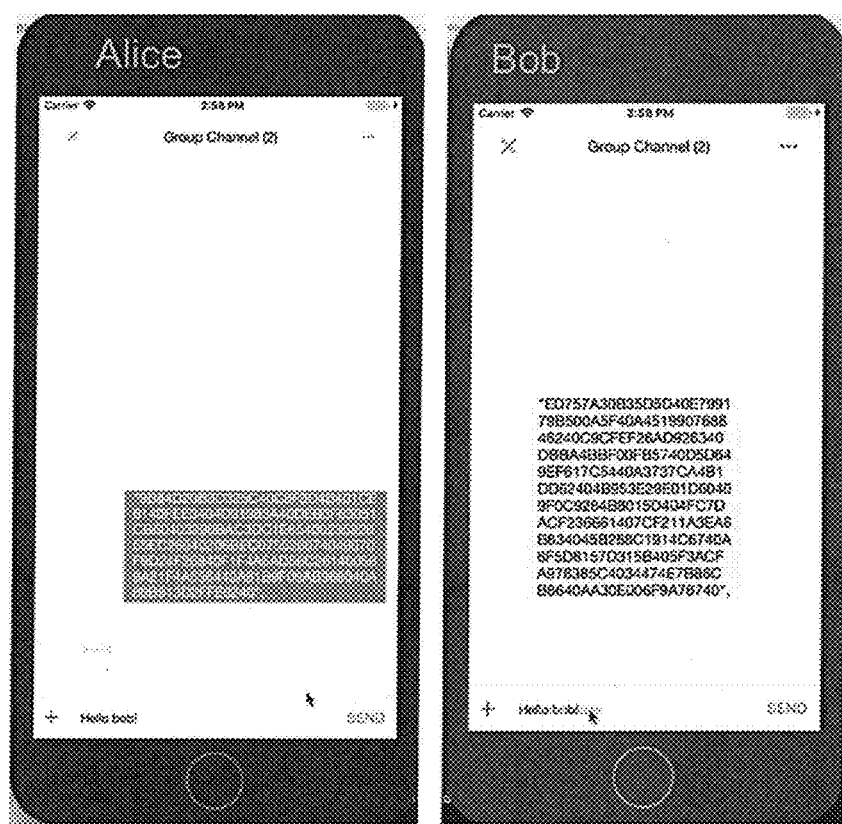
FIG. 4 illustrates example user interfaces of a program to perform cryptography key operations according to various embodiments described herein.

A computer program was developed to implement the method described herein. As shown in FIG. 4, Alice securely sends her secret text "Hello bob" to Bob using the three pass transaction. In FIG. 4, random values appear to a third party during the three pass transaction (specially shown in the blue box).

Among other benefits, the processes described herein can be used to achieve unbreakable (or nearly unbreakable) encryption over wireless, wired, and public networks, and against quantum computing attacks. It requires relatively little processing power for encrypting and decrypting and, thus, can be used for rapid verification and transactions. A practically limitless number of new keys can be generated on the fly. Thus, the keys can be changed on every transaction. Encryption and decryption can also occur on individual devices due to the high speed of encryption and low processing requirements. Further, there is no single point of compromise because every individual party has their own key. If a key is compromised, it is the one compromised and can be renewed or replaced.

An outline of various problems encountered and solutions that can be provided by the cryptographic systems described herein are given in Table 5 below.

TABLE 5

| Problem | Solution |
|---|---|
| Establishing a secure and reliable ID for all transactions | Digital ID system in the cloud for processing Ids ID system only used for registration and verification Information unhackable |
| Having a secure payment system that eliminates fraud | Payment system using ID Email, internet banking, wireless transaction |
| Cryptocurrency that is secure and stable | Absolutely secure, stable, and based on verifiable IDs |
| Fast enough and secure trading system for cryptocurrencies | Rapid trading and verification Trading exchanges connected to Exchange |

TABLE 5-continued

| Problem | Solution |
| --- | --- |
| Mobile Payments | Integrity over wireless signals and public net<br>Transactions cannot be defrauded via screening or copying |
| Key Management System | Cloud key management service ID system to outsource all key management responsibilities |
| People forget passwords and passwords are a weak point in security | Pass eliminates the use of passwords using ID center |

Figure 5:
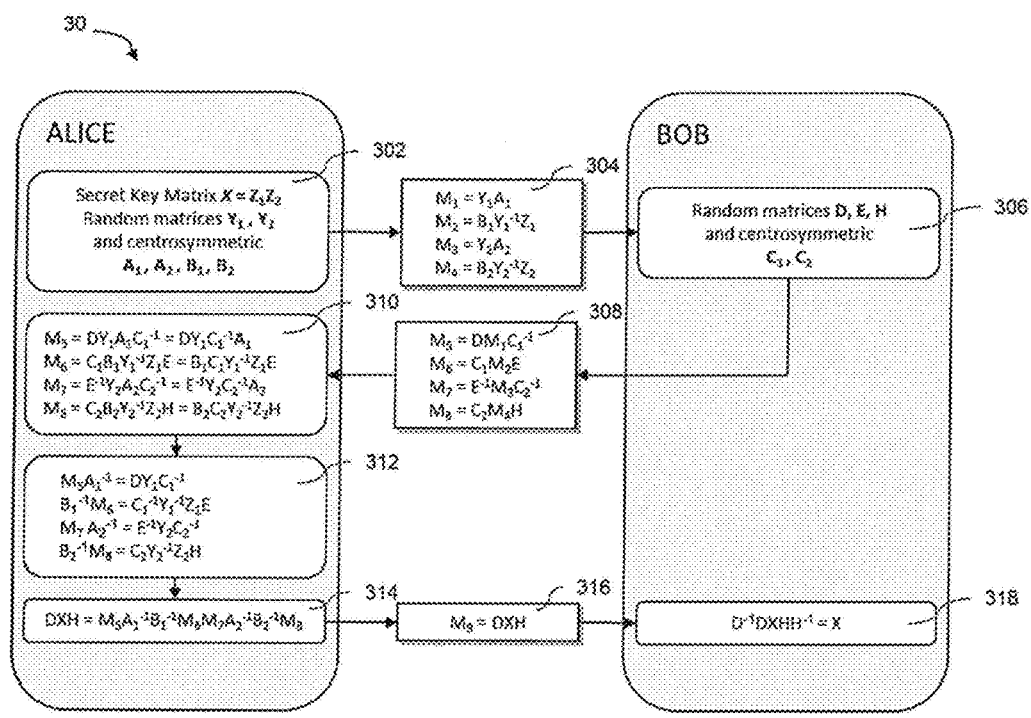
FIG. 5 illustrates a more particular example of a secret key transfer process according to the concepts described herein.

FIG. 5 illustrates a more particular example of a secret key transfer process 30 according to the concepts described herein. While an example using square matrices of a certain size is provided below, the concepts described herein can be extended to use with square matrices of any size. Further, although the example below is presented in certain cases as steps between "Alice" and "Bob," the process is conducted by computing systems or devices.

At the outset, consider the key to be exchanged, K, as a sequence of m bytes, each including one of the ASCII codes from 0 to 255, as follows:

$K=\{k_1, k_2, \ldots, k_m\}, 0 \le k_i \le 255.$

For example, the key string "ABCD" can be presented as ASCII codes K={65, 66, 67, 68}. A sequence of real numbers X can then be defined as a transformation of the key numbers (i.e., $k_1, k_2, k_m$), which are integers, into real ones, as follows:

$X = \Phi(K), \Phi: N^m \to R^m$ and $X = \{x_1, x_2, \ldots, x_m\}, x_i \in R.$ The sequence of real numbers is put into set of second order square matrices, as follows:

$$X = \begin{vmatrix} x_1 & x_2 \\ x_3 & x_4 \end{vmatrix} \ldots \begin{vmatrix} x_{m-3} & x_{m-2} \\ x_{m-1} & x_m \end{vmatrix}$$

If the number of real key numbers is not multiple of four, the last matrix is not fully filled in. In this case, the rest of the matrix members can be generated and added as any random numbers without influencing the algorithm.

Now, assume that Alice wants to pass the secret key K to Bob. For simplicity, however, consider one square matrix X, as follows:

$$X = \begin{vmatrix} x_1 & x_2 \\ x_3 & x_4 \end{vmatrix}$$

The matrix X decomposes into two singular matrices $Z_1$ and $Z_2$:

$X = Z_1 Z_2,$ $$Z_1 = \begin{vmatrix} Z_1 & Z_2 \\ Z_3 & \frac{Z_2 Z_3}{Z_1} \end{vmatrix}, \text{ and}$$

$$Z_2 = \begin{vmatrix} Z_4 & Z_5 \\ Z_6 & \frac{Z_4 Z_5}{Z_6} \end{vmatrix}$$

At step 302, the process includes forming the matrix X as a singular matrix using a number of the real key numbers of the secret key K based on the following relationship $x_4 = x_2 x_3 / x_1$. In that case, the inverse of matrix X, or $X^{-1}$, does not exist (see properties of singular matrices and matrix determinants in APPENDIX). In that case, the matrix X represents a portion of the secret key K, $\{k_1, k_2, k_3\}$.

As part of a first pass transaction, at step 302, the process further includes generating a uniformly distributed random matrices $Y_1$, $Y_2$ and inverse matrices $Y_1^{-1}$, $Y_2^{-1}$, as follows:

$$Y_1 = \begin{vmatrix} y_1 & y_2 \\ y_3 & y_4 \end{vmatrix},$$

$$Y_1^{-1} = \frac{\begin{vmatrix} y_4 & -y_2 \\ -y_3 & y_1 \end{vmatrix}}{y_1 y_4 - y_2 y_3}, y_i \in R, y_1 y_4 \ne y_2 y_3,$$

$$Y_2 = \begin{vmatrix} y_5 & y_6 \\ y_7 & y_8 \end{vmatrix}, \text{ and}$$

$$Y_2^{-1} = \frac{\begin{vmatrix} y_8 & -y_6 \\ -y_7 & y_5 \end{vmatrix}}{y_5 y_8 - y_6 y_7}, y_i \in R, y_5 y_8 \ne y_6 y_7.$$

At step 302, the process also includes generating uniformly distributed random centrosymmetric $A_1$, $A_2$, $B_1$, $B_2$, and inverse $A_1^{-1}$, $A_2^{-1}$, $B_1^{-1}$, $B_2^{-1}$ matrices as follows:

$$A_1 = \begin{vmatrix} a_1 & a_2 \\ a_2 & a_1 \end{vmatrix},$$

$$A_2 = \begin{vmatrix} a_3 & a_4 \\ a_4 & a_3 \end{vmatrix},$$

$$A_1^{-1} = \frac{\begin{vmatrix} a_1 & -a_2 \\ -a_2 & a_1 \end{vmatrix}}{a_1^2 - a_2^2},$$

$$A_2^{-1} = \frac{\begin{vmatrix} a_3 & -a_4 \\ -a_4 & a_3 \end{vmatrix}}{a_3^2 - a_4^2}, a_i \in R, a_1^2 \ne a_2^2, a_3^2 \ne a_4^2,$$

$$B_1 = \begin{vmatrix} b_1 & a_2 \\ b_2 & b_1 \end{vmatrix},$$

$$B_2 = \begin{vmatrix} b_3 & b_4 \\ b_4 & b_3 \end{vmatrix},$$

$$B_1^{-1} = \frac{\begin{vmatrix} b_1 & -b_2 \\ -b_2 & b_1 \end{vmatrix}}{b_1^2 - b_2^2},$$

$$B_2^{-1} = \begin{vmatrix} b_3 & -b_4 \\ -b_4 & b_3 \end{vmatrix}, b_i \in R, b_1^2 \ne b_2^2, b_3^2 \ne b_4^2.$$

Centrosymmetric square matrices A and B are always of the form AB=BA.

At step 304, the process includes Alice generating and sending matrices $M_1$ and $M_2$ to Bob, as follows:

$$M_1 = \begin{vmatrix} m_1^{(1)} & m_2^{(1)} \\ m_3^{(1)} & m_4^{(1)} \end{vmatrix},$$

$$M_2 = \begin{vmatrix} m_1^{(2)} & m_2^{(2)} \\ m_3^{(2)} & m_4^{(2)} \end{vmatrix},$$

$$M_3 = \begin{vmatrix} m_1^{(3)} & m_2^{(3)} \\ m_3^{(3)} & m_4^{(3)} \end{vmatrix}, \text{ and}$$

-continued $$M_4 = \begin{vmatrix} m_1^{(4)} & m_2^{(4)} \\ m_3^{(4)} & m_4^{(4)} \end{vmatrix}.$$

which are generated according to the following calculations:

$$M_1 = Y_1 A_1, \quad (3)$$

$$M_2 = B_1 Y_1^{-1} Z_1, \quad (4)$$

$$M_3 = Y_2 A_2, \text{ and} \quad (5)$$

Thus, at step 304, Alice sends to Bob fourteen publicly visible values ($m_1^{(1)}$, $m_2^{(1)}$, $m_3^{(1)}$, $m_4^{(1)}$, $m_1^{(2)}$, $m_2^{(2)}$, $m_3^{(2)}$, $m_1^{(3)}$, $m_2^{(3)}$, $m_3^{(3)}$, $m_4^{(3)}$, $m_1^{(4)}$, $m_2^{(4)}$, $m_3^{(4)}$) of matrices $M_1$, $M_2$, $M_3$ and $M_4$ that are calculated from twenty-two independent unknown (for the third party) variables ($a_1$, $a_2$, $a_3$, $a_4$, $b_1$, $b_2$, $b_3$, $b_4$, $y_1$, $y_2$, $y_3$, $y_4$, $y_5$, $y_6$, $y_7$, $y_8$, $z_1$, $z_2$, $z_3$, $z_4$, $z_5$, $z_6$) known by Alice only, as follows:

$$m_1^{(1)} = a_1 y_1 + a_2 y_2,$$

$$m_2^{(1)} = a_2 y_1 + a_1 y_2,$$

$$m_3^{(1)} = a_1 y_3 + a_2 y_4,$$

$$m_4^{(1)} = a_2 y_3 + a_1 y_4,$$

$$m_1^{(2)} = \frac{b_1(x_1 y_4 - x_3 y_2) + b_2(x_3 y_1 - x_1 y_3)}{y_1 y_4 - y_2 y_3},$$

$$m_2^{(2)} = \frac{b_1(x_2 y_4 - y_2 x_2 x_3 / x_1) + b_2(y_1 x_2 x_3 / x_1 - x_2 y_3)}{y_1 y_4 - y_2 y_3},$$

$$m_3^{(2)} = \frac{b_2(x_1 y_4 - x_3 y_2) + b_1(x_3 y_1 - x_1 y_3)}{y_1 y_4 - y_2 y_3},$$

$$m_1^{(3)} = a_3 y_5 + a_4 y_6,$$

$$m_2^{(3)} = a_4 y_5 + a_3 y_6,$$

$$m_3^{(3)} = a_3 y_7 + a_4 y_8,$$

$$m_4^{(3)} = a_4 y_7 + a_3 y_8,$$

$$m_1^{(4)} = \frac{b_3(x_4 y_8 - x_6 y_6) + b_4(x_6 y_5 - x_4 y_7)}{y_5 y_4 - y_6 y_3},$$

$$m_2^{(4)} = \frac{b_3\left(x_5 y_8 - y_6 \frac{x_5 x_6}{x_4}\right) + b_4\left(y_5 \frac{x_5 x_6}{x_4} - x_5 y_7\right)}{y_5 y_8 - y_6 y_7}, \text{ and}$$

$$m_3^{(4)} = \frac{b_4(x_4 y_8 - x_6 y_6) + b_3(x_6 y_5 - x_4 y_7)}{y_5 y_8 - y_6 y_7}.$$

The variable $m_4^{(2)}$ and $m_4^{(4)}$ of the singular matrices $M_2$ and $M_2$ are used as $m_4^{(2)} = m_2^{(2)} m_3^{(2)}/m_1^{(2)}$ and $m_4^{(2)} = m_2^{(2)} m_3^{(2)}/m_1^{(2)}$.

As a second pass transaction, at step 306, the process includes Bob receiving the $M_1$ and $M_2$ matrices from Alice. At step 306, the process includes generating uniformly distributed random centrosymmetric matrices $C_1$, $C_2$ and inverse $C_1^{-1}$, $C_2^{-1}$ matrices, as follows:

$$C_1 = \begin{vmatrix} c_1 & c_2 \\ c_2 & c_1 \end{vmatrix},$$

$$C_2 = \begin{vmatrix} c_3 & c_4 \\ c_4 & c_3 \end{vmatrix},$$

$$C_1^{-1} = \frac{\begin{vmatrix} c_1 & -c_2 \\ -c_2 & c_1 \end{vmatrix}}{c_1^2 - c_2^2}, c_i \in R, c_1^2 \neq c_2^2, \text{ and}$$

$$C_2^{-1} = \frac{\begin{vmatrix} c_3 & -c_4 \\ -c_4 & c_3 \end{vmatrix}}{c_3^2 - c_4^2}, c_i \in R, c_3^2 \neq c_4^2.$$

The process at step 306 also includes generating uniformly distributed random matrices D and H, as follows:

$$D = \begin{vmatrix} d_1 & d_2 \\ d_3 & d_4 \end{vmatrix}, \text{ and}$$

$$H = \begin{vmatrix} h_1 & h_2 \\ h_3 & h_4 \end{vmatrix}, d_i, h_i \in R, d_1 d_4 \neq d_2 d_3, h_1 h_4 \neq h_2 h_3.$$

The process at step 306 also includes generating corresponding inverse matrices $D^{-1}$ and $H^{-1}$, as follows:

$$D^{-1} = \frac{\begin{vmatrix} d_1 & d_2 \\ d_3 & d_4 \end{vmatrix}}{d_1 d_4 - d_2 d_3}, \text{ and}$$

$$H^{-1} = \frac{\begin{vmatrix} h_1 & h_2 \\ h_3 & h_4 \end{vmatrix}}{h_1 h_4 - h_2 h_3}.$$

The process at step 306 also includes generating the matrices $M_5$, $M_6$, $M_7$ and $M_8$, as follows:

$$M_5 = \begin{vmatrix} m_1^{(5)} & m_2^{(5)} \\ m_3^{(5)} & m_4^{(5)} \end{vmatrix},$$

$$M_6 = \begin{vmatrix} m_1^{(6)} & m_2^{(6)} \\ m_3^{(6)} & m_4^{(6)} \end{vmatrix},$$

$$M_6 = \begin{vmatrix} m_1^{(7)} & m_2^{(7)} \\ m_3^{(7)} & m_4^{(7)} \end{vmatrix}, \text{ and}$$

$$M_8 = \begin{vmatrix} m_1^{(8)} & m_2^{(8)} \\ m_3^{(8)} & m_4^{(8)} \end{vmatrix}$$

as a result of the following calculations:

$$M_5 = DM_1 C_1^{-1} = D_1 Y_1 A_1 C_1^{-1}, \quad (7)$$

$$M_6 = C_1 M_2 E = C_1 B_1 Y_1^{-1} Z_1 E, \quad (8)$$

$$M_7 = E^{-1} M_3 C_2^{-1} = E^{-1} Y A_2 C_2^{-1}, \text{ and} \quad (9)$$

$$M_8 = C_2 M_4 H = C_2 B_2 Y_2^{-1} Z_2 H. \quad (10)$$

At step 308, the process includes Bob sending to Alice fourteen publicly visible values ($m_1^{(5)}$, $m_2^{(5)}$, $m_3^{(5)}$, $m_4^{(5)}$, $m_1^{(6)}$, $m_2^{(6)}$, $m_3^{(6)}$, $m_1^{(7)}$, $m_2^{(7)}$, $m_3^{(7)}$, $m_4^{(7)}$, $m_1^{(8)} m_2^{(8)}$, $m_3^{(8)}$) of matrices $M_3$ and $M_4$ that are calculated from sixteen independent unknown (for the third party) variables ($c_1$, $c_2$, $c_3$, $c_4$, $d_1$, $d_2$, $d_3$, $d_4$, $e_1$, $e_2$, $e_3$, $e_4$, $h_1$, $h_2$, $h_3$, $h_4$) which are known by Bob only, as follows:

$$m_1^{(5)} = \frac{c_1(d_1 m_1^{(1)} + d_2 m_3^{(1)}) - c(d_1 m_2^{(1)} + d_2 m_4^{(1)})}{c_1^2 - c_2^2},$$

$$m_2^{(5)} = \frac{c_1(d_1 m_2^{(1)} + d_2 m_4^{(1)}) - c_2(d_1 m_1^{(1)} + d_2 m_3^{(1)})}{c_1^2 - c_2^2},$$

-continued $$m_3^{(5)} = \frac{c_1(d_3m_1^{(1)} + d_4m_3^{(1)}) - c_2(d_3m_2^{(1)} + d_4m_4^{(1)})}{c_1^2 - c_2^2},$$

$$m_4^{(5)} = \frac{c_1(d_3m_2^{(1)} + d_4m_4^{(1)}) - c_2(d_3m_1^{(1)} + d_4m_3^{(1)})}{c_1^2 - c_2^2},$$

$$m_1^{(6)} = (c_1m_1^{(2)} + c_2m_3^{(2)})e_1 + (c_1m_2^{(2)} + c_2m_4^{(2)})e_3,$$

$$m_2^{(6)} = (c_1m_1^{(2)} + c_2m_3^{(2)})e_2 + (c_2m_2^{(2)} + c_2m_4^{(2)})e_4,$$

$$m_3^{(6)} = (c_2m_1^{(2)} + c_2m_3^{(2)})e_1 + (c_1m_2^{(2)} + c_1m_4^{(2)})e_3,$$

$$m_4^{(6)} = m_2^{(6)}m_3^{(6)}/m_1^{(6)},$$

$$m_1^{(7)} = \frac{c_3(e_4m_1^{(3)} - e_2m_3^{(3)}) - c_4(e_4m_2^{(3)} - e_2m_4^{(3)})}{(c_3^2 - c_4^3)(e_1e_4 - e_2e_3)},$$

$$m_2^{(7)} = \frac{c_3(e_4m_2^{(3)} - e_2m_4^{(3)}) - c_4(e_4m_1^{(3)} - e_2m_3^{(3)})}{(c_3^2 - c_4^3)(e_1e_4 - e_2e_3)},$$

$$m_3^{(7)} = \frac{c_3(e_1m_3^{(3)} - e_3m_1^{(3)}) - c_4(e_1m_4^{(3)} - e_3m_2^{(3)})}{(c_3^2 - c_4^2)(e_1e_4 - e_2e_3)},$$

$$m_4^{(7)} = \frac{c_3(e_1m_4^{(3)} - e_3m_2^{(3)}) - c_4(e_1m_3^{(3)} - e_3m_1^{(3)})}{(c_3^2 - c_4^2)(e_1e_4 - e_2e_3)},$$

$$m_1^{(8)} = (c_3m_1^{(4)} + c_4m_3^{(4)})h_1 + (c_3m_2^{(4)} + c_4m_4^{(4)})h_3,$$

$$m_2^{(8)} = (c_3m_1^{(4)} + c_4m_3^{(4)})h_2 + (c_3m_2^{(4)} + c_4m_4^{(4)})h_4,$$

$$m_3^{(8)} = (c_3m_1^{(4)} + c_3m_3^{(4)})h_1 + (c_4m_2^{(4)} + c_3m_4^{(4)})h_3, \text{ and}$$

As a third pass transaction, at step 310, the process includes Alice receiving from Bob the matrices $M_3$, $M_6$, $M_7$, and $M_8$ as follows:

$$M_5 = DY_1A_1C_1^{-1},$$

$$M_6 = C_1B_1Y_1^{-1}Z_1E,$$

$$M_7 = E^{-1}Y_2A_2C_2^{-1}, \text{ and}$$

$$M_8 = CBY^{-1}XH.$$

Note that centrosymmetric matrices satisfy the following conditions:

$$AC^{-1} = C^{-1}A \text{ and}$$

$$CB = BC,$$

meaning that the matrices $M_5$, $M_6$, $M_7$, and $M_8$ can be transformed into:

$$M_5 = DY_1A_1C_1^{-1} = DY_1C_1^{-1}A_1,$$

$$M_6 = C_1B_1Y_1^{-1}Z_1E = B_1C_1Y_1^{-1}Z_1E,$$

$$M_7 = E^{-1}Y_2A_2C_2^{-1} = E^{-1}Y_2C_2^{-1}A_2, \text{ and}$$

$$M_8 = C_2B_2Y_2^{-1}Z_2H = B_2C_2Y_2^{-1}Z_2H.$$

Thus, at step 312, the process includes multiplying the matrices $M_5$, $M_6$, $M_7$ and $M_8$ with the known inverse matrices $A_1^{-1}$, $A_2^{-1}$, $B_1^{-1}$ and $B_2^{-1}$, respectively, as follows:

$$M_5A_1^{-1} = DY_1C_1^{-1}A_1A_1^{-1} = DY_1C_1^{-1},$$

$$B_1^{-1}M_6 = B_1^{-1}B_1C_1Y_1^{-1}Z_1E = C_1Y_1^{-1}Z_1E,$$

$$M_7A_2^{-1} = E^{-1}Y_2C_2^{-1}A_2A_2^{-1} = E^{-1}Y_2C_2^{-1}, \text{ and}$$

$$B_2^{-1}M_8 = B_2^{-1}B_2C_2Y_2^{-1}Z_2H = C_2Y_2^{-1}Z_2H.$$

Further, at step 314, the process includes multiplying the results of those together to arrive at the matrix $M_5$, as follows:

$$M_9 = M_5A_1^{-1}B_1^{-1}M_6M_7A_2^{-1}B_2^{-1}M_8,$$

$$M_9 = DY_1C_1^{-1}C_1Y_1^{-1}Z_1EE^{-1}Y_2C_2^{-1}C_2Y_2^{-1}Z_2H = DZ_1Z_2H,$$

such that $$M_9 = DXH, \quad (11)$$

and $$M_9 = \begin{vmatrix} m_1^{(9)} & m_2^{(9)} \\ m_3^{(9)} & m_4^{(9)} \end{vmatrix}.$$

At step 316, the process includes Alice sending the following three publicly visible values to Bob ($m_1^{(9)}$, $m_2^{(9)}$, $m_3^{(9)}$, as follows:

$$m_1^{(9)} = (d_1x_1 + d_2x_3)h_1 + (d_1x_2 + d_2x_4)h_3,$$

$$m_2^{(9)} = (d_1x_1 + d_2x_3)h_2 + (d_1x_2 + d_2x_4)h_4,$$

$$m_3^{(9)} = (d_3x_1 + d_4x_3)h_1 + (d_3x_2 + d_4x_4)h_3, \text{ and}$$

$$m_4^{(9)} = m_3^{(9)}m_2^{(9)}/m_1^{(9)}.$$

Thus, as part of the final key restoration at step 316, Bob receives the matrix M9 from Alice, as follows:

$$M_9 = DXH.$$

At step 318, the process includes Bob restoring the key X from Alice by using inverse matrices $D^{-1}$ and $H^{-1}$, which are known to Bob, and the matrix $M_5$, as follows:

$$D^{-1}M_9H^{-1} = D^{-1}DXHH^{-1} = X.$$

As shown in Table 6 below, the entire scheme of the key exchange process can be performed using an exchange of matrices with a corresponding number of different unknown independent variables (underlined in Table 6) and visible (by the third party) values (bolded in Table 6). This scheme demonstrates that the number of unknown independent variables always exceeds the number of visible independent values in any combination of subsets of matrices.

This means that the system of nonlinear equations is an indeterminate system. There are no algorithms for the third party to obtain unknown independent variables including the secret key X using the visible independent values.

TABLE 6

| | | Variables | Independent Variables | | Values | |
|---|---|---|---|---|---|---|
| 1 | Alice | $Y_1A_1$ | $A_1$[2], $Y_1$[4] | 22 | $M_1$[4] | 4 | 14 |
| | | $B_1Y_1^{-1}Z_1$ | $B_1$[2], $Z_1$[3] | | $M_2$[4] | 3 | |

TABLE 6-continued

| | | Variables | Independent Variables | | Values | |
|---|---|---|---|---|---|---|
| | | $Y_2A_2$ | $A_2[2], Y_2[4]$ | | $M_3[4]$ 4 | |
| | | $B_2Y_2^{-1}Z_2$ | $B_2[\underline{2}], Z_2[\underline{3}]$ | | $M_4[4]$ 3 | |
| 2 | Bob | $DY_1A_1C_1^{-1}$ | $D[\underline{4}], C_1[\underline{2}]$ | 16 | $M_5[4]$ 4 | 14 |
| | | $C_1B_1Y_1^{-1}Z_1E$ | $E[4]$ | | $M_6[4]$ 3 | |
| | | $B^{-1}Y_2A_2C_2^{-1}$ | | | $M_7[4]$ 4 | |
| | | $C_2B_2Y_2^{-1}Z_2H$ | $C_2[2], H[4]$ | | $M_8[4]$ 3 | |
| 3 | Alice | DXH | | | $M_9[3]$ 3 | 3 |
| | Total | | | $\underline{38}$ | 31 | |

The direct restoration of the matrix X (using formula transformations of Eqs.3-11 is also impossible. Note that the matrix X is singular. It leads to several features, which are used to perform the key exchange algorithm resistant against the third party decryption (see APPENDIX):

The matrices $M_2$, $M_4$, $M_6$, $M_8$, and $M_9$ $$M_2 = B_1 Y_1^{-1} Z_1,$$

$$M_4 = B_2 Y_2^{-1} Z_2,$$

$$M_6 = C_1 B_1 Y_1^{-1} Z_1 E,$$

$$M_8 = C_2 B_2 Y_2^{-1} Z_2 H, \text{ and}$$

$$M_9 = D Z_1 Z_2 H$$

are also singular (due to the matrices $Z_1$ and $Z_2$ being singular).

Thus, the equation $M_5 L_1 M_6 M_7 L_2 M_8 = M_9$ (from the Eqs. 7-10) can not be resolved in regards to centrosymmetric matrices $L_1 = A_1^{-1} B_1^{-1}$ and $L_2 = A_2^{-1} B_2^{-1}$ by the third party as far as the matrix $M_9$ is singular so, the direct calculation $X = M_1 L_1 M_2 M_3 L_2 M_4$ is not possible.

Figure 6:
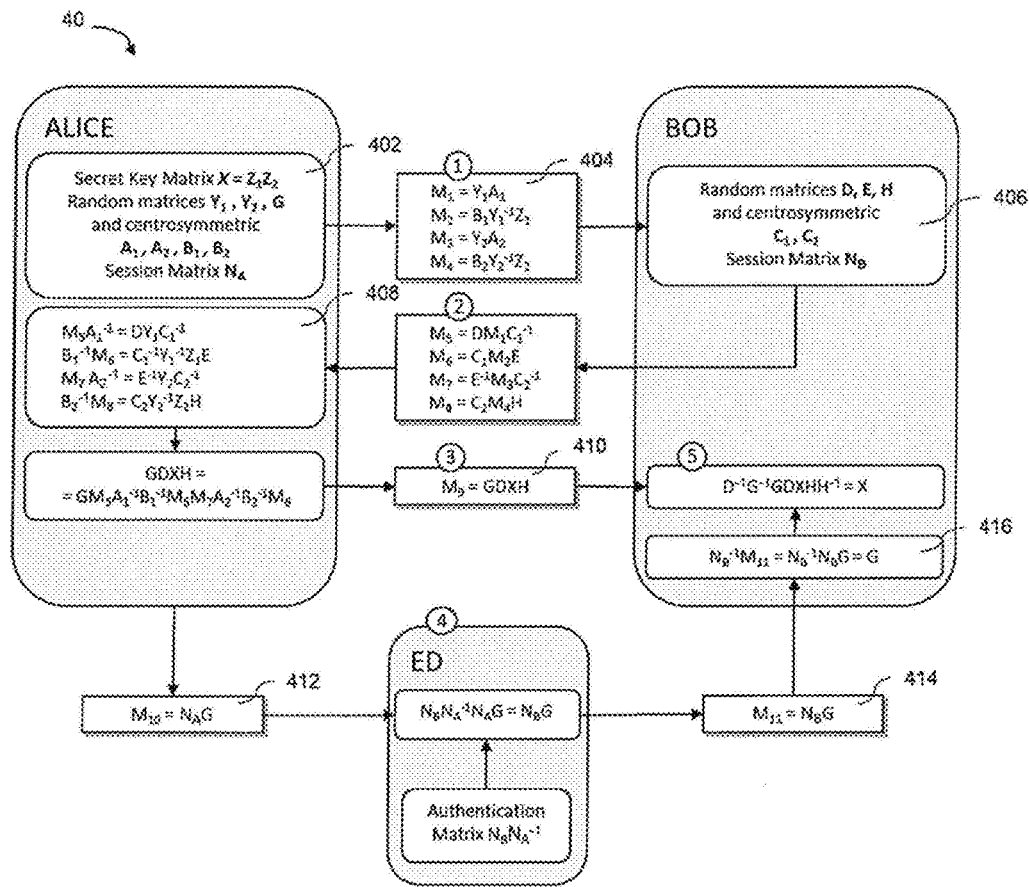
FIG. 6 illustrates an example of a secret key transfer process using authentication according to the concepts described herein.

The concepts described herein can be used for other cryptographic operations, such as key exchanging using authentication. FIG. 6 illustrates an example secret material or key exchanging process using authentication according to the concepts described herein.

As shown in FIG. 6, Alice wants to pass the secret key K to Bob. They use Ed as an independent party for authentication. In the transaction, the square singular matrix $$X = \begin{vmatrix} x_1 & x_2 \\ x_3 & x_4 \end{vmatrix}$$

is used to represent the key $K = \{k_1, k_2, k_3\}$, where $x_4 = x_2 x_3 / x_1$.

It is assumed that Alice and Bob both have passed the authentication procedure and both have got corresponding session numbers $N_1^A$, $N_2^A$ and $N_1^B$, $N_2^B$ from Ed according to the concepts described above.

Alice and Bob form centrosymmetric matrices $N^A$ and $N^B$ correspondently, as follows:

$$N_A = \begin{vmatrix} N_1^A & N_2^A \\ N_2^A & N_1^A \end{vmatrix} \text{ and } N_{AB} = \begin{vmatrix} N_1^B & N_2^B \\ N_2^B & N_1^B \end{vmatrix}.$$

As part of a first pass transaction, at step 402, the process 40 includes Alice generating uniformly distributed random matrices $Y_1$, $Y_2$ and inverse matrices $Y_1^{-1}$, $Y_2^{-1}$, as follows:

$$Y_1 = \begin{vmatrix} y_1 & y_2 \\ y_3 & y_4 \end{vmatrix},$$

$$Y_1^{-1} = \frac{\begin{vmatrix} y_4 & -y_2 \\ -y_3 & y_1 \end{vmatrix}}{y_1 y_4 - y_2 y_3}, y_i \in R, y_1 y_4 \neq y_2 y_3,$$

$$Y_2 = \begin{vmatrix} y_5 & y_6 \\ y_7 & y_8 \end{vmatrix}, \text{ and}$$

$$Y_2^{-1} = \frac{\begin{vmatrix} y_8 & -y_6 \\ -y_7 & y_5 \end{vmatrix}}{y_5 y_8 - y_6 y_7}, y_i \in R, y_5 y_8 \neq y_6 y_7.$$

Alice also generates uniformly distributed random centrosymmetric matrices A and B, as follows:

$$A_1 = \begin{vmatrix} a_1 & a_2 \\ a_2 & a_1 \end{vmatrix},$$

$$A_2 = \begin{vmatrix} a_3 & a_4 \\ a_4 & a_3 \end{vmatrix},$$

$$A_1^{-1} = \frac{\begin{vmatrix} a_1 & -a_2 \\ -a_2 & a_1 \end{vmatrix}}{a_1^2 - a_2^2},$$

$$A_2^{-1} = \frac{\begin{vmatrix} a_3 & a_4 \\ a_4 & a_3 \end{vmatrix}}{a_3^2 - a_4^2}, a_i \in R, a_1^2 \neq a_2^2, a_3^2 \neq a_4^2,$$

$$B_1 = \begin{vmatrix} b_1 & b_2 \\ b_2 & b_1 \end{vmatrix},$$

$$B_2 = \begin{vmatrix} b_3 & b_4 \\ b_4 & b_3 \end{vmatrix},$$

$$B_2^{-1} = \begin{vmatrix} b_3 & -b_4 \\ -b_4 & b_3 \end{vmatrix}, b_i \in R, b_1^2 \neq b_2^2, b_3^2 \neq b_4^2,$$

Note that any centrosymmetric square matrices A and B always have the following feature: AB=BA. At step 404, the process includes Alice sending to Bob results as matrices $M_1$ and $M_2$, as follows:

$$M_1 = \begin{vmatrix} m_1^{(1)} & m_2^{(1)} \\ m_3^{(1)} & m_4^{(1)} \end{vmatrix},$$

$$M_2 = \begin{vmatrix} m_1^{(2)} & m_2^{(2)} \\ m_3^{(2)} & m_4^{(2)} \end{vmatrix},$$

$$M_3 = \begin{vmatrix} m_1^{(3)} & m_2^{(3)} \\ m_3^{(3)} & m_4^{(3)} \end{vmatrix}, \text{ and}$$

$$M_4 = \begin{vmatrix} m_1^{(4)} & m_2^{(4)} \\ m_3^{(4)} & m_4^{(4)} \end{vmatrix}.$$

of the following calculations:

$$M_1 = Y_1 A_1, \tag{1B}$$

$$M_2 = B_1 Y_1^{-1} Z_1, \tag{2B}$$

$$M_3 = Y_2 A_2, \text{ and} \tag{3B}$$

$$M_4 = B_2 Y_2^{-1} Z_2. \tag{4B}$$

As part of a second pass transaction, at step 406, Bob receives $M_1$ and $M_2$ from Alice. Bob generates uniformly distributed random centrosymmetric matrices $C_1$, $C_2$ and inverse $C_1^{-1}$, $C_2^{-1}$ matrices, as follows:

$$C_1 = \begin{vmatrix} c_1 & c_2 \\ c_2 & c_1 \end{vmatrix},$$

$$C_2 = \begin{vmatrix} c_3 & c_4 \\ c_4 & c_3 \end{vmatrix},$$

$$C_1^{-1} = \frac{\begin{vmatrix} c_1 & -c_2 \\ -c_2 & c_1 \end{vmatrix}}{c_1^2 - c_2^2}, c_i \in R, c_1^2 \neq c_2^2, \text{ and}$$

$$C_2^{-1} = \frac{\begin{vmatrix} c_3 & -c_4 \\ -c_4 & c_3 \end{vmatrix}}{c_3^2 - c_4^2}, c_i \in R, c_3^2 \neq c_4^2.$$

and uniformly distributed random matrices D and H, as follows:

$$D = \begin{vmatrix} d_1 & d_2 \\ d_3 & d_4 \end{vmatrix}, \text{ and}$$

$$H = \begin{vmatrix} h_1 & h_2 \\ h_3 & h_4 \end{vmatrix}, d_i, h_i \in R, d_1 d_4 \neq d_2 d_3, h_1 h_4 \neq h_2 h_3,$$

and correspondent inverse matrices $D^{-1}$ and $H^{-1}$, as follows:

$$D^{-1} = \frac{\begin{vmatrix} d_1 & d_2 \\ d_3 & d_4 \end{vmatrix}}{d_1 d_4 - d_2 d_3}, \text{ and}$$

$$H^{-1} = \frac{\begin{vmatrix} h_1 & h_2 \\ h_3 & h_4 \end{vmatrix}}{h_1 h_4 - h_2 h_3}.$$

At step 406, Bob also obtains the matrices $M_5$, $M_6$, $M_7$, and $M_8$, defined as follows:

$$M_5 = \begin{vmatrix} m_1^{(5)} & m_2^{(5)} \\ m_3^{(5)} & m_4^{(5)} \end{vmatrix},$$

$$M_6 = \begin{vmatrix} m_1^{(6)} & m_2^{(6)} \\ m_3^{(6)} & m_4^{(6)} \end{vmatrix},$$

$$M_7 = \begin{vmatrix} m_1^{(7)} & m_2^{(7)} \\ m_3^{(7)} & m_4^{(7)} \end{vmatrix}, \text{ and}$$

$$M_8 = \begin{vmatrix} m_1^{(8)} & m_2^{(8)} \\ m_3^{(8)} & m_4^{(8)} \end{vmatrix}.$$

as a result of the following calculations:

$$M_5 = D M_1 C_1^{-1} = D Y_1 A_1 C_1^{-1}, \tag{5B}$$

$$M_6 = C_1 M_2 E = C_1 B_1 Y_1^{-1} Z_1 E, \tag{6B}$$

$$M_7 = E^{-1} M_3 C_2^{-1} = E^{-1} Y A_2 C_2^{-1}, \text{ and} \tag{7B}$$

$$M_8 = C_2 M_4 H = C_2 B_2 Y_2^{-1} Z_2 H. \tag{8B}$$

As part of a third pass transaction, at step 408, the process includes Alice generating a uniformly distributed random matrix G, as follows:

$$G = \begin{vmatrix} g_1 & g_2 \\ g_3 & g_4 \end{vmatrix}, g_i \in R.$$

Alice receives from Bob the matrices $M_5$, $M_6$, $M_7$ and $M_8$, as follows:

$$M_5 = D Y_1 A_1 C_1^{-1} = D Y_1 C_1^{-1} A_1,$$

$$M_6 = C_1 B_1 Y_1^{-1} Z_1 E = B_1 C_1 Y_1^{-1} Z_1 E,$$

$$M_7 = E^{-1} Y_2 A_2 C_2^{-1} = E^{-1} Y_2 C_2^{-1} A_2, \text{ and}$$

$$M_8 = C_2 B_2 Y_2^{-1} Z_2 H = B_2 C_2 Y_2^{-1} Z_2 H.$$

At step 408, the process also includes Alice multiplying both the matrices $M_5$, $M_6$, $M_7$ and $M_8$ with the inverse matrices which are known to her, $A_1^{-1}$, $A_2^{-1}$, $B_1^{-1}$ and $B_2^{-1}$, respectively, as follows:

$$B_1^{-1} M_6 = B_1^{-1} B_1 C_1 Y_1^{-1} Z_1 E = C_1 Y_1^{-1} Z_1 E,$$

$$B_1^{-1} M_6 = B_1^{-1} B_1 C_1 Y_1^{-1} Z_1 E = C_1 Y_1^{-1} Z_1 E,$$

$$M_7 A_2^{-1} = E^{-1} Y_2 C_2^{-1} A_2 A_2^{-1} = E^{-1} Y_2 C_2^{-1}, \text{ and}$$

$$B_2^{-1} M_8 = B_2^{-1} B_2 C_2 Y_2^{-1} Z_2 H = C_2 Y_2^{-1} Z_2 H,$$

$$M_5 = G M_5 A_1^{-1} B_1^{-1} M_6 M_7 A_2^{-1} B_2^{-1} M_8 =$$
$$G D Y_1 C_1^{-1} C_1 Y_1^{-1} Z_1 E E^{-1} Y_2 C_2^{-1} C_2 Y_2^{-1} Z_2 H, \text{ such}$$

$M_9 = GDXH(9B)$, where $$M_9 = \begin{vmatrix} m_1^{(9)} & m_2^{(9)} \\ m_3^{(9)} & m_4^{(9)} \end{vmatrix}.$$

At step 410, the process includes Alice sending three publicly visible values to Bob, including ($m_1^{(9)}$, $m_2^{(9)}$, $m_3^{(9)}$). The matrix M is singular and $m_4^{(9)} = m_3^{(9)} m_2^{(9)} / m_1^{(9)}$. At step 412, Alice also sends four publicly visible values to Ed ($m_1^{(6)}$, $m_2^{(6)}$, $m_3^{(6)}$, $m_4^{(6)}$) of the matrix $M_{10}$, defined as:

$$M_{10} = \begin{vmatrix} m_1^{(10)} & m_2^{(10)} \\ m_3^{(10)} & m_4^{(10)} \end{vmatrix},$$

as a result of the following calculations:

$$M_{10} = N^A G. \tag{9B}$$

For authentication, Ed receives the matrix M6 from Alice. At step 414, Ed sends to Bob the matrix $M_{11}$ using the inverse matrix $(N^A)^{-1}$ and the matrix $N^{B'}$ as follows:

$$M_{11} = N^B (N^A)^{-1} N^A G = N^B G,$$

$$M_{11} = N^B G. \tag{10B}$$

As part of the final key restoration, at step 416, the process includes Bob receiving the matrix $M_{11}$ from Ed and obtaining the matrix G using the inverse matrix $(N^B)^{-1}$, as follows:

$$G = (N^B)^{-1} M_{11} = (N^B)^{-1} N^B G.$$

Bob also receives the matrix $M_9$ from Alice at step 410. Using inverse matrices $G^{-1}$, $D^{-1}$, and $H^{-1}$, which are known to Bob, he can restore the key X from the received matrix $M_5$ as follows:

$$D^{-1}G^{-1}M_9H^{-1}=D^{-1}C^{-1}GDXHH^{-1}=X.$$

The embodiments described herein can be implemented by either a method or process or as a system or device. The method can be performed using any suitable computing device, and the system can be embodied as any suitable computing device. The computing device can include at least one processing system, for example, having one or more processors and memories electrically and communicatively coupled together using a local interface. The local interface can be embodied as a data bus with an accompanying address/control bus or other addressing, control, and/or command lines.

In various embodiments, the memory can store data and software or executable code components executable by the processor. For example, the memory can store executable-code components associated with cryptographic operations for execution by the processor. The software or executable-code components can be developed using or embodied in various programming languages, such as, for example, C, C++, C#, Objective C, JAVA®, JAVASCRIPT®, Perl, PHP, VISUAL BASIC®, PYTHON®, RUBY, FLASH®, or other programming languages.

The embodiments can rely, in part, on executable instructions or instructions for execution by the computing device. The terms "executable" or "for execution" refer to software forms that can ultimately be run or executed by a processor, whether in source, object, machine, or other form. Examples of executable programs include, for example, a compiled program that can be translated into a machine code format and loaded into a random access portion of memory and executed by a processor, source code that can be expressed in an object code format and loaded into a random access portion of the memory and executed by the processor, or source code that can be interpreted by another executable program to generate instructions in a random access portion of the memory and executed by the processor, etc.

An executable program can be stored in any portion or component of the memory including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD)) or digital versatile disc (DVD)), floppy disk, magnetic tape, or other memory component.

Although the process diagram shown in FIGS. 2 and 5 illustrate a certain order, it is understood that the order can differ from that which is depicted. For example, an order of execution of two or more blocks can be scrambled relative to the order shown. Also, two or more blocks shown in succession can be executed concurrently or with partial concurrence.

Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any algorithm, method, process, or logic described herein that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIG. 2. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

The invention claimed is:

1. A method of cryptography, comprising:
   encrypting a symmetric key by applying at least one associative cryptography key operation to the symmetric key to generate an encrypted symmetric key, wherein the at least one associative cryptography key operation is based on applying a polynomial function composed by a combination of independent random variables with uniform probability distribution and white noise randomization;
   transmitting, with a first computing device, the encrypted symmetric key from the first computing device to a second computing device;
   decrypting the encrypted symmetric key by applying at least one inverse associative cryptography key operation to the encrypted symmetric key to produce the symmetric key.

2. A computing device comprising:
   a processor; and
   a memory for storing an application to be executed by the processor, the application, which when executed, causes the processor to:
   encrypt a symmetric key by applying at least one associative cryptography key operation to the symmetric key to generate an encrypted symmetric key, wherein the at least one associative cryptography key operation is based on applying a polynomial function composed by a combination of independent random variables with uniform probability distribution and white noise randomization; and transmit the encrypted symmetric key to a remote computing device, wherein the remote computing device receives the encrypted symmetric key transmitted and decrypts the encrypted symmetric key by applying at least one inverse associative cryptography key operation to the encrypted symmetric key to produce the symmetric key.

3. A system, comprising:

a first computing device comprising:
- a first processor; and
- a first memory for storing a first application to be executed by the first processor, the application, which when executed, causes the processor to:
  - encrypt a symmetric key by applying at least one associative cryptography key operation to the symmetric key to generate an encrypted symmetric key, wherein the at least one associative cryptography key operation is based on applying a polynomial function composed by a combination of independent random variables with uniform probability distribution and white noise randomization; and
  - transmit the encrypted symmetric key to a second computing device; and the second computing device comprising:
- a second processor; and
- a second memory for storing a second application to be executed by the second processor, the application, which when executed, causes the processor to:
  - receive the encrypted symmetric key transmitted from the first computing device; and
  - decrypt the encrypted symmetric key by applying at least one inverse associative cryptography key operation to the encrypted symmetric key to produce the symmetric key.

* * * * *